US011347731B2

(12) United States Patent
Luo et al.

(10) Patent No.: US 11,347,731 B2
(45) Date of Patent: May 31, 2022

(54) DERIVING METRICS FROM QUERIES

(71) Applicant: MicroStrategy Incorporated, Vienna, VA (US)

(72) Inventors: Yi Luo, Herndon, VA (US); Ananya Ojha, Dunn Loring, VA (US); Zhili Cheng, Dunn Loring, VA (US); Dongping Liang, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 258 days.

(21) Appl. No.: 16/579,392

(22) Filed: Sep. 23, 2019

(65) Prior Publication Data

US 2020/0019546 A1    Jan. 16, 2020

Related U.S. Application Data

(63) Continuation-in-part of application No. 16/368,282, filed on Mar. 28, 2019, which is a continuation of application No. 14/606,178, filed on Jan. 27, 2015, now Pat. No. 10,255,320.

(60) Provisional application No. 62/021,625, filed on Jul. 7, 2014, provisional application No. 61/931,970, filed on Jan. 27, 2014.

(51) Int. Cl.
  *G06F 16/24*    (2019.01)
  *G06F 16/245*    (2019.01)
(52) U.S. Cl.
  CPC ................... *G06F 16/245* (2019.01)
(58) Field of Classification Search
  CPC ............ G06F 16/248; G06F 16/24568; G06F 16/2455; G06F 16/245; G06F 16/24522; G06F 16/90335; G06F 16/243; G06F 16/25; G06F 16/903; G06F 16/3329; G06F 16/90332; G06F 16/907; G06F 16/287; G06F 16/3344; G06F 16/24535; G06F 16/24553
  See application file for complete search history.

(56) References Cited

U.S. PATENT DOCUMENTS

| | | |
|---|---|---|
| 4,769,772 A | 9/1988 | Dwyer |
| 5,414,469 A | 5/1995 | Gonzales et al. |
| 5,590,319 A | 12/1996 | Cohen et al. |
| 6,442,522 B1 | 8/2002 | Carberry et al. |
| 6,701,294 B1 | 3/2004 | Ball et al. |

(Continued)

OTHER PUBLICATIONS

US Office Action in U.S. Appl. No. 16/368,282, dated Jun. 10, 2021, 16 pages.

(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

Methods, systems, apparatus, and computer-readable media for deriving data elements from queries. In some implementations, a query is received, and one or more computers determine that the query involves an operation that satisfies one or more criteria. In response data is saved that indicates a derived data element corresponding to the operation. The one or more computers provide data causing a representation of the derived data element to be presented, such as data causing an interactive control representing the derived data element to be presented on a user interface.

20 Claims, 24 Drawing Sheets

(56) References Cited

U.S. PATENT DOCUMENTS

| | | |
|---|---|---|
| 7,181,444 B2 | 2/2007 | Porter et al. |
| 7,356,840 B1 | 4/2008 | Bedell et al. |
| 7,827,125 B1 | 11/2010 | Rennison |
| 8,024,666 B2 | 9/2011 | Thompson |
| 8,103,608 B2 | 1/2012 | Green et al. |
| 8,296,475 B2 | 10/2012 | Kottomtharayil |
| 8,402,052 B2 | 3/2013 | Sano et al. |
| 8,495,627 B2 | 7/2013 | Barsness et al. |
| 8,695,009 B2 | 4/2014 | Vojnovic et al. |
| 8,825,720 B1 | 9/2014 | Xie et al. |
| 8,886,631 B2 | 11/2014 | Abadi et al. |
| 8,924,978 B2 | 12/2014 | Meng et al. |
| 8,996,523 B1 | 3/2015 | Fisher |
| 9,092,266 B2 | 7/2015 | Boutin et al. |
| 9,128,763 B2 | 9/2015 | Sarkar et al. |
| 9,129,448 B2 | 9/2015 | Bekmambetov et al. |
| 9,141,611 B2 | 9/2015 | Crook |
| 9,183,540 B2 | 10/2015 | Eberlein et al. |
| 9,229,950 B2 | 1/2016 | Chen et al. |
| 9,411,853 B1 | 8/2016 | Dovrtel et al. |
| 9,411,861 B2 | 8/2016 | Bestgen et al. |
| 9,456,049 B2 | 9/2016 | Soundararajan et al. |
| 9,514,220 B1 | 12/2016 | Wright |
| 9,672,122 B1 | 6/2017 | Gandhi et al. |
| 10,095,759 B1 | 10/2018 | Cappiello |
| 10,108,676 B2 | 10/2018 | Li |
| 10,223,376 B2 | 3/2019 | Lee et al. |
| 10,255,320 B1 | 4/2019 | Cappiello |
| 10,303,557 B2 | 5/2019 | Pradhan et al. |
| 10,740,005 B1 | 8/2020 | Ives et al. |
| 2002/0032676 A1 | 3/2002 | Reiner et al. |
| 2003/0233403 A1 | 12/2003 | Bae et al. |
| 2004/0165780 A1 | 8/2004 | Maki et al. |
| 2005/0050036 A1 | 3/2005 | Araki |
| 2005/0091283 A1 | 4/2005 | Debique et al. |
| 2005/0102371 A1 | 5/2005 | Aksu |
| 2005/0187977 A1 | 8/2005 | Frost |
| 2005/0203878 A1 | 9/2005 | Brill et al. |
| 2006/0004674 A1 | 1/2006 | Tesser |
| 2006/0053171 A1 | 3/2006 | Eldridge et al. |
| 2006/0155687 A1 | 7/2006 | Chon |
| 2006/0155688 A1 | 7/2006 | Chou |
| 2006/0227970 A1 | 10/2006 | Nakano |
| 2007/0112754 A1 | 5/2007 | Haigh et al. |
| 2007/0130131 A1 | 6/2007 | Porter |
| 2007/0208690 A1 | 9/2007 | Schneider et al. |
| 2007/0245383 A1 | 10/2007 | Bhide et al. |
| 2008/0005677 A1 | 1/2008 | Thompson |
| 2008/0033915 A1 | 2/2008 | Chen et al. |
| 2008/0033925 A1 | 2/2008 | Richards |
| 2008/0155197 A1 | 6/2008 | Li et al. |
| 2008/0172362 A1 | 7/2008 | Shacham |
| 2008/0189655 A1 | 8/2008 | Koi et al. |
| 2008/0250021 A1 | 10/2008 | Boys et al. |
| 2009/0104123 A1 | 4/2009 | Yang et al. |
| 2009/0112949 A1 | 4/2009 | Ergan et al. |
| 2009/0164412 A1 | 6/2009 | Bestgen et al. |
| 2009/0287673 A1 | 11/2009 | Chronister et al. |
| 2009/0327883 A1 | 12/2009 | Robertson et al. |
| 2010/0131254 A1 | 5/2010 | Rubin et al. |
| 2011/0000407 A1 | 2/2011 | Sercinoglu et al. |
| 2011/0040733 A1 | 2/2011 | Sercinoglu et al. |
| 2011/0137850 A1 | 6/2011 | Mourey et al. |
| 2011/0225288 A1 | 9/2011 | Easterday et al. |
| 2011/0264657 A1 | 10/2011 | Hoffman et al. |
| 2011/0302583 A1 | 12/2011 | Abadi et al. |
| 2011/0314057 A1 | 12/2011 | Banfer |
| 2012/0016678 A1 | 1/2012 | Gruber et al. |
| 2012/0023101 A1 | 1/2012 | Heimendinger et al. |
| 2012/0084296 A1 | 4/2012 | Waters |
| 2012/0102053 A1 | 4/2012 | Barrett et al. |
| 2012/0136649 A1 | 5/2012 | Freising et al. |
| 2012/0179714 A1 | 7/2012 | Chandhok et al. |
| 2012/0226804 A1 | 9/2012 | Raja |
| 2012/0233191 A1 | 9/2012 | Ramanujam |
| 2013/0013552 A1 | 1/2013 | Eshleman et al. |
| 2013/0013883 A1 | 1/2013 | Kottomtharayil et al. |
| 2013/0018903 A1 | 1/2013 | Taranov |
| 2013/0097177 A1 | 4/2013 | Fan et al. |
| 2013/0132967 A1 | 5/2013 | Soundararajan et al. |
| 2013/0166547 A1 | 6/2013 | Pasumarthi et al. |
| 2013/0166573 A1 | 6/2013 | Vaitheeswaran et al. |
| 2013/0191418 A1 | 7/2013 | Martin, Jr. et al. |
| 2013/0241926 A1 | 9/2013 | Asaria et al. |
| 2013/0254155 A1 | 9/2013 | Thollot et al. |
| 2014/0025626 A1* | 1/2014 | Mefford .............. G06F 16/2453 707/603 |
| 2014/0040306 A1* | 2/2014 | Gluzman Peregrine ..................... G06F 16/2477 707/769 |
| 2014/0095480 A1 | 4/2014 | Marantz et al. |
| 2014/0101139 A1* | 4/2014 | Gemert ............. G06F 16/24575 707/722 |
| 2014/0149446 A1 | 5/2014 | Kuchmann-Beauger et al. |
| 2014/0149839 A1 | 5/2014 | Bedard et al. |
| 2014/0195558 A1 | 7/2014 | Murthy et al. |
| 2014/0280032 A1 | 9/2014 | Kornacker et al. |
| 2014/0280372 A1 | 9/2014 | Huras et al. |
| 2014/0310712 A1 | 10/2014 | Meng et al. |
| 2014/0358845 A1 | 12/2014 | Mundlapudi et al. |
| 2014/0365429 A1 | 12/2014 | Wagner et al. |
| 2014/0372427 A1 | 12/2014 | Lehmann et al. |
| 2015/0006518 A1 | 1/2015 | Baumgartner et al. |
| 2015/0135255 A1 | 5/2015 | Theimer et al. |
| 2015/0169688 A1 | 6/2015 | Halverson et al. |
| 2015/0178052 A1 | 6/2015 | Gupta et al. |
| 2015/0193719 A1 | 7/2015 | Than et al. |
| 2015/0212663 A1 | 7/2015 | Papale et al. |
| 2015/0242856 A1 | 8/2015 | Dhurandhar et al. |
| 2015/0248501 A1 | 9/2015 | Kamel et al. |
| 2015/0317362 A1 | 11/2015 | Teranishi |
| 2015/0347450 A1 | 12/2015 | Phelan et al. |
| 2015/0355989 A1 | 12/2015 | Hayden et al. |
| 2016/0048584 A1 | 2/2016 | Valentin |
| 2016/0105328 A1 | 4/2016 | Cooper et al. |
| 2016/0154852 A1 | 6/2016 | Chen et al. |
| 2016/0239487 A1 | 8/2016 | Potharaju et al. |
| 2017/0039209 A1 | 2/2017 | Gupta et al. |
| 2017/0039281 A1 | 2/2017 | Venkata et al. |
| 2017/0220633 A1 | 8/2017 | Porath et al. |
| 2017/0270209 A1 | 9/2017 | Mueller et al. |
| 2018/0081798 A1 | 3/2018 | Alcantara et al. |
| 2018/0182398 A1 | 6/2018 | Halstvedt et al. |
| 2018/0308149 A1 | 10/2018 | Guo et al. |
| 2019/0121802 A1 | 4/2019 | Venkataraman et al. |
| 2019/0310977 A1 | 10/2019 | Pal et al. |
| 2019/0384759 A1 | 12/2019 | Cappiello et al. |
| 2020/0012638 A1 | 1/2020 | Luo et al. |
| 2020/0250191 A1 | 8/2020 | Cappiello |
| 2021/0157813 A1 | 5/2021 | Hammad et al. |
| 2021/0173714 A1 | 6/2021 | Huang et al. |

OTHER PUBLICATIONS archives.microstratey.com [online], "What's New in MicroStrategy 11.0," retrieved on Feb. 13, 2020, retrieved from URL <https://doc-archives.microstrategy.com/producthelp/11.0/Readme/content/whats_new.htm>, 2019, 8 pages.

archives.microstratey.com [online], "How to Use Natural Language Queries" retrieved on Feb. 13, 2020, retrieved from URL <https://doc-archives.microstrategy.com/producthelp/11.0/Workstation/WebHelp/Lang_1033/Content/nlq.htm>, 2019, 2 pages.

Cheng, "Conversing with Your Data Using Natural Language to Boost Self-Service Analytics" MicroStrategy, Jan. 2019, 31 pages.

community.microstrategy.com [online], "KB442148: Natural Language Query in A Nutshell in MicroStrategy Web," retrieved on Feb. 13, 2020, retrieved from URL <https://community.microstrategy.com/s/article/Natural-Language-Query-in-A-Nutshell-MicroStrategy-11-0?language=en_US>, Nov. 26, 2019, 14 pages.

community.microstrategy.com [online], "Natural Language Homepage", retrieved on May 26, 2020, retrieved from URL <https://

(56) References Cited

OTHER PUBLICATIONS community.microstrategy.com [online], "Natural-Language-Homepage? language=en_US>, Apr. 2017, 5 pages.
juvo.be [online], "Gartner Magic Quadrant for Business Intelligence and Analylics Platforms" retrieved May 26, 2020, retrieved from URL <https://www.juvo.be/blog/gartner-magic-quadrant-business-intelligence-and-analytics-platforms>, Feb. 2013, 53 pages.
microstrategy.com [online], "How to Use Natural Language Queries," retrieved on May 26, 2020, retrieved from URL <https://www2.microstrategy.com/producthelp/current/MSTRWeb/WebHelp/Lang_1033/Content/nlq.htm>, Sep. 2018, 2 pages.
microstratey.com [online], "What's new in MicroStrategy 11.0", retrieved on Feb. 13, 2020 retrieved from URL <https://www.microstrategy.com/getmedia/93eb0bce-5aa3-4100-a39d-3f53eb1f73dd/microstrategy-release-notes_11-0>, 2018, 34 pages.
searchbusinessanalytics.techtarget.com [online], "4 ways natural language querying in BI tools can benefit users," retrieved on May 26, 2020, retrieved from URL <https://searchbusinessanalytics.techtarget.com/feature/4-ways-natural-language-querying-in-BI-tools-can-benefit-users>, Dec. 2018 , 5 pages.
smartbridge.com [online], "What you need to know about the new and improved MicroStrategy Dossier," retrieved on May 26, 2020, retrieved from URL <https://smartbridge.com/what-you-need-to-know-about-the-new-and-improved-microstrategy-dossier/> Jul. 2019, 8 pages.
US Office Action in U.S. Appl. No. 15/955,541, dated Oct. 8, 2019, 10 pages.
mindmajix.com [online], "MicroStrategy Latest Version (11.0)—New Features," retrieved on May 26, 2020, retrieved from URL <https://mindmajix.com/microstrategy-11-0-version-new-features>, Jan. 2019, 18 pages.
US Office Action in U.S. Appl. No. 16/566,339, dated Aug. 31, 2021, 14 pages.
[No Author Listed], "Deploy Enterprise Analytics Applications Using the Native Hadoop Gateway," Powerpoint, Dec. 13, 2017, 41 pages.
Borthakur, "HDFS Architecture Guide," The Apache Software Foundation, 2006, 13 pages.
community.microstrategy.com [online], "Articles KB275774: How to connect the MicroStrategy Enterprise Platform 10.x to Apache Spark SQL," May 11, 2017, retrieved on Mar. 23, 2020, retrieved from URL <https://community.microstrategy.com/s/article/KB275774-How-to-connect-the-MicroStrategy-Enterprise-Platform-10?language=en_US>, 5 pages.
community.microstrategy.com [online], "Connecting to Hadoop with MicroStrategy," Jun. 7, 2017, retrieved on Mar. 23, 2020, retrieved from URL <https://community.microstrategy.com/s/article/Connecting-to-Hadoop-with-MicroStrategy?language=en_US>, 3 pages.
community.microstrategy.com [online], "KB248914: Overview and installation of the MicroStrategy 10.0-10.5 Secure Enterprise Platform Hadoop Gateway (Big Data Engine)," May 30, 2017. retrieved on Mar. 23, 2020, retrieved from URL <https://community.microstrategy.com/s/article/KB248914-Overview-and-installation-of-the-MicroStrategy-10?language=en_US>, 6 pages.
doc-archives.microstrategy.com [online], "Analyzing Big Data in MicroStrategy," Oct. 7, 2016, retrieved on Mar. 23, 2020, retrieved from URL <https://doc-archives.microstrategy.com/producthelp/10.7/WebUser/WebHelp/Lang_1033/Content/mstr_big_data.htm>, 21 pages.
doc-archives.microstrategy.com [online], "Introduction to the MicroStrategy Hadoop Gateway," 2019, retrieved on Mar. 23, 2020, retrieved from URL <https://doc-archives.microstrategy.com/producthelp/10.11/InstallConfig/WebHelp/Lang_1033/Content/hadoop_gateway_intro.htm>, 2 pages.
Eltabakh. "Hadoop: A Framework for DataIntensive Distributed Computing", Powerpoint presentation at Worcester Polytechnic Institute, Spring 2012, 28 pages.
en.wikipedia.org [online], "Apache Hadoop," Mar. 2019, retrieved on Mar. 23, 2020, retrieved from URL <https://en.wikipedia.org/wiki/Apache_Hadoop>, 12 pages.
en.wikipedia.org [online], "Apache Spark," May 2019, retrieved on Mar. 23, 2020, retrieved from URL <https://en.wikipedia.org/wiki/Apache_Spark>, 8 pages.
en.wikipedia.org [online], "Scala (programming language)" Jan. 2019, retrieved on Mar. 23, 2020, retrieved from URL <https://en.wikipedia.org/wiki/Scala_(programming_language)>, 29 pages.
Maru et al., "Tapping Into Hadoop and NoSQL Data Sources with MicroStrategy," Powerpoint Presentation at MicroStrategy World 2014, 2014, 38 pages.
ProPublica [online], "Chapter 1. Using Google Refine to Clean Messy Data," Nguyen, Dec. 30, 2010, [retrieved on Sep. 2, 2015], Retrieved from the Internet: URL<https://www.propublica.org/nerds/item/using-google-refine-for-data-cleaniiig>, 10 pages.
Shvachko et al., "The Hadoop Distributed File System," IEEE, 2010, 10 pages.
towardsdatascicence.com [online], "Big Data From B to A: The Hadoop Distributed Filesystem—HDFS," Nov. 25, 2019, retrieved on Mar. 23, 2020, retrieved from URL <https://towardsdatascience.com/big-data-from-b-to-a-the-hadoop-distributed-filesystem-hdfs-992612cbf8aa>, 6 pages.
US Office Action in U.S. Appl. No. 16/368,282, dated Nov. 9, 2021, 13 pages.
US Office Action in U.S. Appl. No. 16/705,630, dated Dec. 24, 2021, 15 pages.
US Office Action in U.S. Appl. No. 16/853,629, dated Dec. 8, 2021, 15 pages.
US Office Action in U.S. Appl. No. 17/102,996, dated Oct. 20, 2021, 57 pages.
Wikipedia [online], "OpenRefine." last updated Jul. 15, 2015, [retrieved on Sep. 2, 2015], Retrieved from the Internet: URL<https://en.wikipedia.org/wiki/OpenRefine>, 4 pages.
www.ibm.com [online], "HDFS Scale an Apache Hadoop cluster to hundreds of nodes with the Hadoop Distributed File System (HDFS)" May 28, 2019, retrieved on Mar. 24, 2020, retrieved from URL <https://www.ibm.com/analytics/hadoop/hdfs>, 5 pages.
www.microstrategy.com [online], "What's new in MicroStrategy 10.11" Apr. 10, 2018, retrieved on Mar. 23, 2020, retrieved from URL <https://www.microstrategy.com/getmedia/5466690f-f81a-4cf4-8f16-e0d1fa220690/MicroStrategy-release-notes_10-11>, 36 pages.
www.theta.co.nz [online], "MicroStrategy version 10 enables big data engine support," Nov. 18, 2015, retrieved on Mar. 23, 2020, retrieved from URL <https://www.theta.co.nz/news-blogs/tech-blog/microstrategy-version-10-enables-big-data-engine-support/>, 3 pages.
www2.microstrategy.com [online]. "Installing MicroStrategy Hadoop Gateway", 2017, retrieved on Mar. 23, 2020, retrieved from URL <https://www2.microstrategy.com/producthelp/10.4/InstallConfig/Content/InstallationConfig/installing_microstrategy_hadoop_gateway.htm>, 8 pages.

\* cited by examiner

| | Context | Query | Derived Data Element(s) | Label for Derived Data Element | Data Type |
|---|---|---|---|---|---|
| | 1781 | 1782 | 1783 | 1784 | 1785 |
| 1790a → | Document1 | How many records are there? | Count of records in Table1 in DataSet1 | Record Count | Integer (count) |
| 1790b → | User A & DataSet2 | Show the total manufacturing cost for each widget | Add Materials_Column and Labor_Column, in Table3 of DataSet2 | Widget Mfg. Cost | Column of Currency Values |
| 1790c → | DataSet3 | Show a chart of average temperature by country for north america | Average of Temperature_Column of DataSet3, where country = United States | Avg. Temp: USA | Number (temperature) |
| 1790d → | DataSet3 | Show a chart of average temperature by country for north america | Average of Temperature_Column of DataSet3, where country = Canada | Avg. Temp: Canada | Number (temperature) |
| 1790e → | DataSet3 | Show a chart of average temperature by country for north america | Average of Temperature_Column of DataSet3, where country = Mexico | Avg. Temp: Mexico | Number (temperature) |
| 1790f → | Documents referencing DataSet4 | What are the fastest and slowest trip times? | Minimum of TripTime_Column in DataSet4 | Fastest Time | Number (hours) |
| 1790g → | Documents referencing DataSet4 | What are the fastest and slowest trip times? | Maximum of TripTime_Column in DataSet4 | Slowest Time | Number (hours) |
| 1790h → | Document2 & User in Engineering Department | What product had the highest failure rate over the last year? | for each unique ID value for ID_column in Product_Table, Determine count of failures in Failure_Table where ProductID = ID value and Date is within 1 year | Failure Rate | Column of Numbers (failure rates) |
| | ... | | | | |

| Data References | Sample Query Pattern | Sample Question | Vis. Type | Visualization and Insights |
|---|---|---|---|---|
| Only 1 Metric | What is the [metric] | What is the Number of Flights? | KPI | Number of Flights 88367 |
| 1 Metric + 1 Time Attribute + 0~N Attributes | What is the [metric] by "time attribute" | Please show Profit by Month. | Line Graph | |
| 1 Metric + 1 Geo Attribute + 0~N Attribute | Distribution of [metric] by "geo attribute"<br>A map of [metric] by "geo attribute" and "attribute 2" | What is the Revenue by City? | Map | |
| 2 Metrics + 1 Attribute | Correlation between "metric 1" and "metric 2" by [attribute] | Can you tell me the correlation between Cost and Revenue by Customer Age? | Scatter-plot | |
| 0~N Metric + 1~N Attribute Or 2~N Metric only | What is [metric] by "attribute 1" and by "attribute 2" | What is the Profit by Item and by Customer Gender? | Bar Graph | |

FIG. 20A

DERIVING METRICS FROM QUERIES

CROSS-REFERENCE TO RELATED APPLICATIONS

This application is a continuation-in-part of U.S. application Ser. No. 16/368,282, filed Mar. 28, 2019, which is a continuation of U.S. application Ser. No. 14/606,178, filed Jan. 27, 2015, which claims the benefit of U.S. Application No. 61/931,970, filed Jan. 27, 2014 and U.S. Application No. 62/021,625, filed Jul. 7, 2014, and the contents of all of these prior applications are incorporated by reference.

FIELD

This description relates to search engines and data processing.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage-disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation.

SUMMARY

In some implementations, a computer system provides search functionality to receive a query from a user and provide search results in response. When appropriate conditions are met, the computer system can automatically derive a new data element (e.g., a new metric) based on the query. The computer system saves data defining the automatically derived data element and associates it with the context of the query. Then, when the context occurs again, the computer system can provide the derived data element for any of a variety of purposes, e.g., in a list of metrics along with explicitly defined metrics for the data set, in an interface for defining filter criteria, in an interface for generating a visualization, for display in an information card, and so on. In this manner, the computer system can use queries to learn the types of information that are significant to certain users and contexts. The computer system can store and use the new, automatically derived elements to enhance user interfaces and system behavior even outside of search functionality.

As an example, a computer system may provide search functionality that is available while a user is viewing, editing, or creating a document. The search functionality may be configured to search within the document or to search one or more data sources associated with the document (e.g., data sources from which document content is obtained). A user may submit a natural language query that involves an aggregation of data, such as "show me the number of videos in the collection." When interpreting the query and/or generating results for the query, the computer system may determine that the query requests an aggregation of data, in this case, a count of unique videos that have records in a data set associated with a currently open document. The computer system can provide the results requested by the query, e.g., "There are 125 videos in the collection." In addition, because the computer system identified that the query called for a data aggregation—a count of data elements—the computer system also defines the requested data aggregation as a new derived data element for the document and/or the data set. For example, the computer system can store metadata indicating that a "number of videos" should appear as metric in a list of metrics for the data set when the document is open, even though there is no "number of videos" data field stored in the data set.

The data indicating the derived data element can indicate the parameters needed to perform an operation such as an aggregation again at a later time, e.g., the operation to be performed, an identifier for the data set, a table, a record type, etc. As a result, rather than simply storing the value that was provided as the query response, when the user selects the derived data element to be used the computer system can run the operation again with the up-to-date data in the data set for an accurate result at that time.

When the computer system generates a user interface, the computer system can determine whether any derived data elements are associated with the current context. The derived data elements inferred from queries can be made available in various different ways. For example, based on a user's query entered while a document is open, the computer system may cause a data element derived from the query to be provided only for the specific user and the specific document that were associated with the query. Alternatively, the derived data element may be provided to the user more generally when any of a set of multiple documents is accessed, whenever a particular data set corresponding to the document is used, or when any data set that is related to or similar to the particular data set is involved. Similarly, access to the derived data element may not be limited to the user that entered the query from which the data element is derived. Derived data elements can be provided for groups of users or all users when an appropriate context is detected, e.g., when a relevant document or data set is involved.

Many types of data elements can be derived from queries. Some derived data elements represent calculations performed on data. Rather than being a fixed value, the derived data element can represent a formula or equation applied to a certain set of data, so that the value of the derived data element changes as the underlying data changes. A derived data element may represent a calculation performed on a single piece of data or multiple pieces of data. Some derived data elements may represent aggregations of data, e.g., operations that involve multiple values, multiple portions of a data set (e.g., multiple records, multiple columns of data, multiple tables, etc.), or even data from multiple data sets. A derived data element may represent a single operation to be performed on data from a data set or a combination of multiple operations. Similarly, a derived data element may represent a result of a query, only a portion of a query, or an intermediate part of processing a query. In some cases, multiple different data elements can be derived from a single query.

Many derived data elements represent values or data that does not exist in (e.g., is not stored in or part of) the under data set, and thus must be generated or derived from the data set through some calculation or other processing. Nevertheless, in some implementations, a derived data element may represent a value or values that do exist in the data set, but which have a new use or purpose inferred on the basis of user queries or other interactions. In other words, the calculation or operation represented by a derived data element may simply be to retrieve and provide a particular value or data range. This can include selecting subsets of data, such as presenting a set of data after filtering the set with filter criteria as specified by the derived data element. As another example, users in a certain context may submit queries requesting a value from a specific field in a data set at least a threshold frequency or number of times. As a result, the value from that field can be inferred to be relevant to the context on the basis of user activity, and the value can be inferred to be and displayed as being a metric for the data set, even though the field was never manually defined as a metric for the data set.

The computer system may detect a variety of types of operations to be used for deriving data elements. The operations from which new data elements are derived can include data aggregation operations. As an example, queries that involve any of a predetermined set of operations can be detected as candidates for deriving a new data element, e.g., operations such as determining a maximum, a minimum, a count, a mean, a median, a mode, an average, a sum, a range, a standard deviation, a variance, or a summary. The computer system can detect when these operations are called for by a query, even when the query does not state those particular operations directly. The computer system can evaluate the terms, phrases, and overall structure of a query to identify terms that signal a data aggregation. To facilitate this, the system can store data that maps terms to operations. As an example, the terms "total," "number of," and "how many" can be associated with count or sum operations.

Operations that lead to new derived data elements, such as data aggregations, may also be identified when queries match predetermined grammars or exhibit certain patterns known to represent aggregations. For example, the computer system can semantically interpret a query to identify references to data, such as columns, fields, attributes, metrics, etc. of a data set. The computer system can then determine whether any of various operations (e.g., add, subtract, multiply, divide, concatenate, etc.) are performed on the data. Other techniques can be used to identify or verify that a query involves a data aggregation, such as (i) evaluating a structured form of the query to identify aggregation operations, (ii) evaluating processing steps used to generate results of a query to identify aggregation being performed, and/or (iii) evaluating the results provided for the query.

In one general aspect, a method includes: receiving, by the one or more computers, a query; determining, by the one or more computers, that the query involves an operation that satisfies one or more criteria; in response to determining that the query involves an operation that satisfies one or more criteria, storing, by the one or more computers, data indicating a derived data element corresponding to the operation; and providing, by the one or more computers, data causing an interactive control representing the derived data element to be presented on a user interface.

Implementations can include one or more of the following features. For example, in some implementations, the query is a query submitted by a user through a query interface of an electronic device, and the method includes providing a response to the query for presentation by the electronic device.

In some implementations, the data causing the interactive element to be presented causes the interactive element to be provided outside the query interface and separate from the response to the query.

In some implementations, providing the data causing the interactive control representing the derived data element to be presented on the user interface includes causing the interactive element to be presented by: the electronic device through which the user submitted the query; a different electronic device associated with the user; or to an electronic device associated with a user that is different from the user that submitted the query.

In some implementations, providing the data causing the interactive control representing the derived data element to be presented on the user interface includes, after an end of a session in which the query was submitted, causing the interactive element representing the derived data element to be provided in a subsequent session.

In some implementations, the query requests information from a data set; and providing the data causing the interactive control representing the derived data element to be presented on the user interface includes causing the interactive element to be presented in a list comprising other interactive elements representing elements of the data set.

In some implementations, the other interactive elements include interactive elements representing columns, tables, fields, metrics, attributes, and/or values of the data set.

In some implementations, the interactive element is selectable to cause the data aggregation to be used in filter criteria, a visualization, a mathematical expression, a spreadsheet, a database field, a document, a message, and/or a user interface.

In some implementations, the interactive element is selectable to cause the derived data element to be added to a query field for submitting a query.

In some implementations, the stored data for the derived data element includes an indication of (i) a data set, (ii) one or more portions of the data set and (iii) an operation to apply to the one or more portions of the data set.

In some implementations, the derived data element is saved and provided based on the use of the operation in processing the query, and without any user input indicating that the derived data element should be saved or that the derived data element should be made available for future use.

In some implementations, storing the data indicating the derived data element includes associating the data indicating the derived data element with context data indicating a context associated with the query. Providing the data causing the interactive control representing the derived data element to be presented on a user interface associated with a context that has at least a minimum level of similarity with the context indicted by the context data.

In some implementations, the context indicates a user, a user group, a location, a time, a date, a topic, a credential, a document, a data set, a data cube, a visualization, a report, a dashboard, a computing environment, an application, a user interface, or an application function.

In some implementations, receiving the query includes: receiving a natural language voice query spoken by a user; receiving a natural language query entered to a user interface by a user; receiving a natural language query through an application programming interface; or receiving a structured query.

In some implementations, the derived data element involves an aggregation operation comprising determining a maximum, a minimum, a count, a mean, a median, a mode, an average, a sum, a range, a standard deviation, a variance, or a summary.

In some implementations, determining that the query satisfies the one or more criteria is based on one or more terms or symbols identified in the query.

In some implementations, determining that the query satisfies the one or more criteria is based on a structured form of the query.

In some implementations, determining that the query satisfies the one or more criteria is based on one or more operations used to determine a response to the query.

In general, one innovative aspect of the subject matter described in this specification can be embodied in methods that include the actions of receiving, by one or more processors, a query; identifying search results that are responsive to the query; identifying, based on the query and the search results, structured data to supplement the search results, where the structured data is generated from binary table data that is received and deserialized by one or more processing modules; processing the structured data and the search results; and providing, for output, the processed search results and the processed structured data results.

These and other embodiments can each optionally include one or more of the following features. The one or more processing modules includes a listening module, a receiving module, a decompress module, or a deserialize module. The query is a natural language query. The query is received through a dashboard application. The action of processing the structured data and the search results includes performing analytics, filtering, aggregation, wrangling, searching, data mining, text analytics, on demand loading, incremental refreshing, streaming, data blending, complex ETL workflows, or multi-sourcing. The action of providing, for output, the processed search results and the processed structured data results includes providing, for output and to an in-memory engine, the processed search results and the processed structured data results. The action of processing the structured data and the search results includes identifying a portion of the processing to be performed by an in-memory engine; and providing, to the in-memory engine, the search results and the structured data results. The action of identifying search results that are responsive to the query includes identifying, using a search index, search results that are responsive to the query. The structured data includes a global queue generated from the binary table data that is received and deserialized by the one or more processing modules.

Other embodiments of these aspects include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 17C is a table that shows examples of queries with data about derived data elements defined based on the queries.

FIG. 20A is a table showing an example of selecting visualizations based on queries.

DETAILED DESCRIPTION

Figure 1:
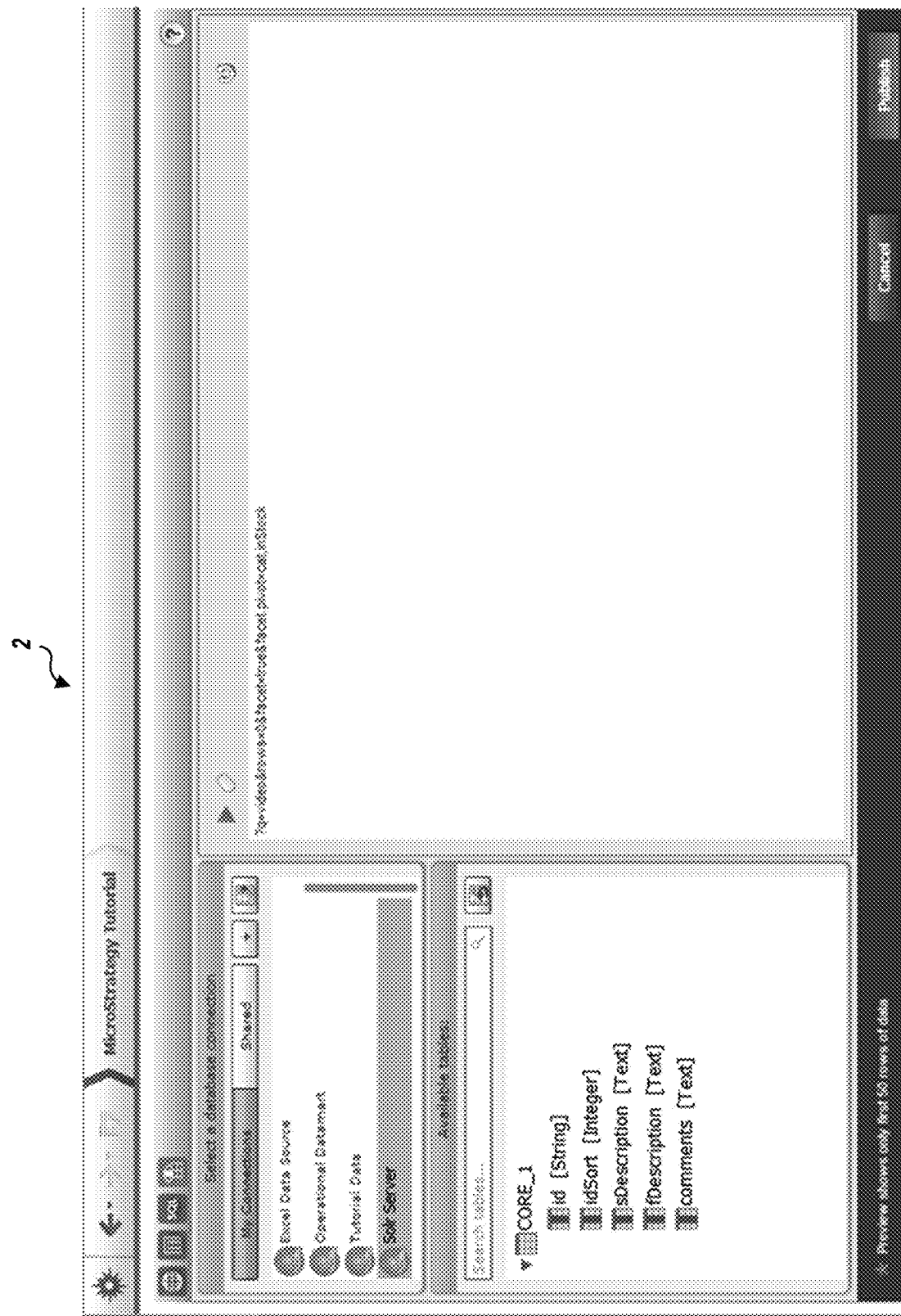
FIG. 1 illustrates an example user interface for browsing search index metadata.

Techniques are described for a system that is configured to connect and interact with a servlet embedded in a web server in a manner that promotes faster data retrieval and searching. The system provides dynamic search query generation, incremental results retrieval, and a search box that is not specific to any attribute.

In some implementations, the system is configured to treat search as a data source. In these implementations, the system may perform natural language processing grid/report creation, may extend metadata object search to report caches, and may perform attribute element searches using search selectors across multiple attributes. Further, in these implementations, the system may use search as the analytic paradigm for unstructured and semi-structured data. The unstructured data searched may include free text, posts and comments, etc., and the semi-structured data may include event log data, strings of key-value pairs, and any attributes (e.g., keys) that are not fully known prior to the time of analysis.

The system also may search some structured data. The structured data may include numerous, but sparse, characteristic attributes, BigTable-like structures, etc. A relational database is to structured data as a search Index in the system is to unstructured and semi-structured data. The system may use a search server (e.g., Solr) as a "database" that speaks search, instead of a structured query language (SQL).

In some examples, a database server may integrate with a search server (e.g., Solr). In these examples, the database server may perform web services in which the database server sends prompted queries to the search server (e.g., Solr) and retrieves results. The database server handles request submissions and results manipulation, and no authentication is necessary.

For example, an error tracking and management system database (e.g., Total Quality Management System) may be indexed via a search server (e.g., Solr). In this example, a mix of structured fields (status, event, etc.) and unstructured fields (short description, long description, case comments, etc.) exists. And, in this example, the indexed error tracking and management system database may provide an issue count dashboard that show a number of issues over time relevant to "derived elements." The indexed error tracking and management system database also may populate a result set via search and perform further subsetting in attribute elements by getting the set of issues relevant to "derived elements" and analyzing from there. The indexed error tracking and management system database further may perform search-as-filter by combining results from search over unstructured data with SQL queries over structured data. In this regard, the indexed error tracking and management system database may display maintenance revenue by year for all customers who logged issues relevant to "derived elements."

In some implementations, a system implements search as a data source using a search server connector (e.g., a Solr connector) with a freeform search expression. In these implementations, the system defines a search server (e.g., a Solr server) as a database instance. The system browses metadata by reading a search server schema file (e.g., a Solr schema file) and the user enters only the search server uniform resource identifier (URI) (e.g., a Solr URI) in the freeform text. The search server connector (e.g., the Solr connector) calls an application programming interface (API) based on information in the database instance. The search server connector (e.g., the Solr connector) transforms results to a table format used by the system.

In some examples, the system may provide dynamic search query generation using a query builder for search. In these examples, the system operates as described above, but uses a graphical interface instead of a freeform URI.

The system also may perform incremental results retrieval. Instead of retrieving a full data set and displaying results, the search results may naturally return a preset number of rows at a time. The system further may use a text value selector in which a search box on a dashboard results in a new search API call to source. In the following disclosure, FIGS. 6-12 and the associated descriptions related to search integration technology that may be used to integrate structured data and unstructured data. Thereafter, search integration features that may be implemented using the systems described with reference to FIGS. 6-12 are discussed in more detail with reference to FIGS. 1-5, 13, and 14.

FIG. 1 illustrates an example user interface 2 for browsing search index metadata. The user interface 2 may be output by the search system described above. As shown in the "Select a database connection" section, each search server (e.g., Solr server) may be modeled as a database instance. Also, a user enters a search query as a freeform string. As shown in the "Available tables:" section, each core (e.g., search index) appears with a list of available fields from the index. This information is retrieved from the search server schema file (e.g., Solr schema file) and presented.

Figure 2:
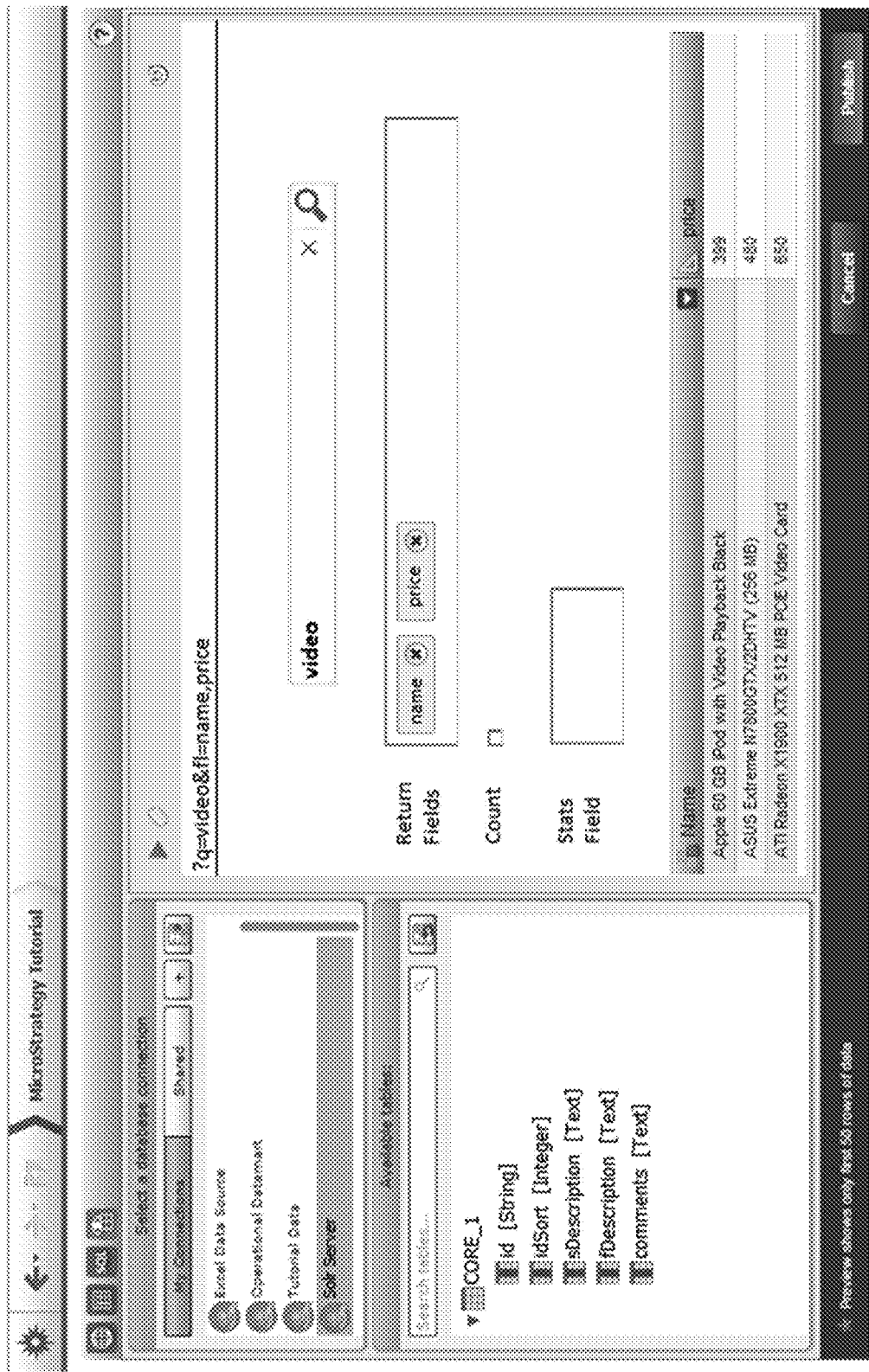
FIG. 2 illustrates an example user interface of a graphical query builder for search.

FIG. 2 illustrates an example user interface 4 of a graphical query builder for search. The user interface 4 may be output by the search system described above. The user interface 4 shows a dynamically-generated search string that is automatically generated based on the text entered in the text input control, the return fields entered in the return fields input control, the count check box, and the stats field. The return fields input control defines facets or fields to be returned by the search. The stats field is a field on which to calculate Sum, Min, Max, etc. If the stats field is left empty, no stats are computed. As shown, the dynamically-generated search string was generated based on the text "video" entered in the text input control and the fields "name" and "price" entered in the return fields input control.

Figure 3:
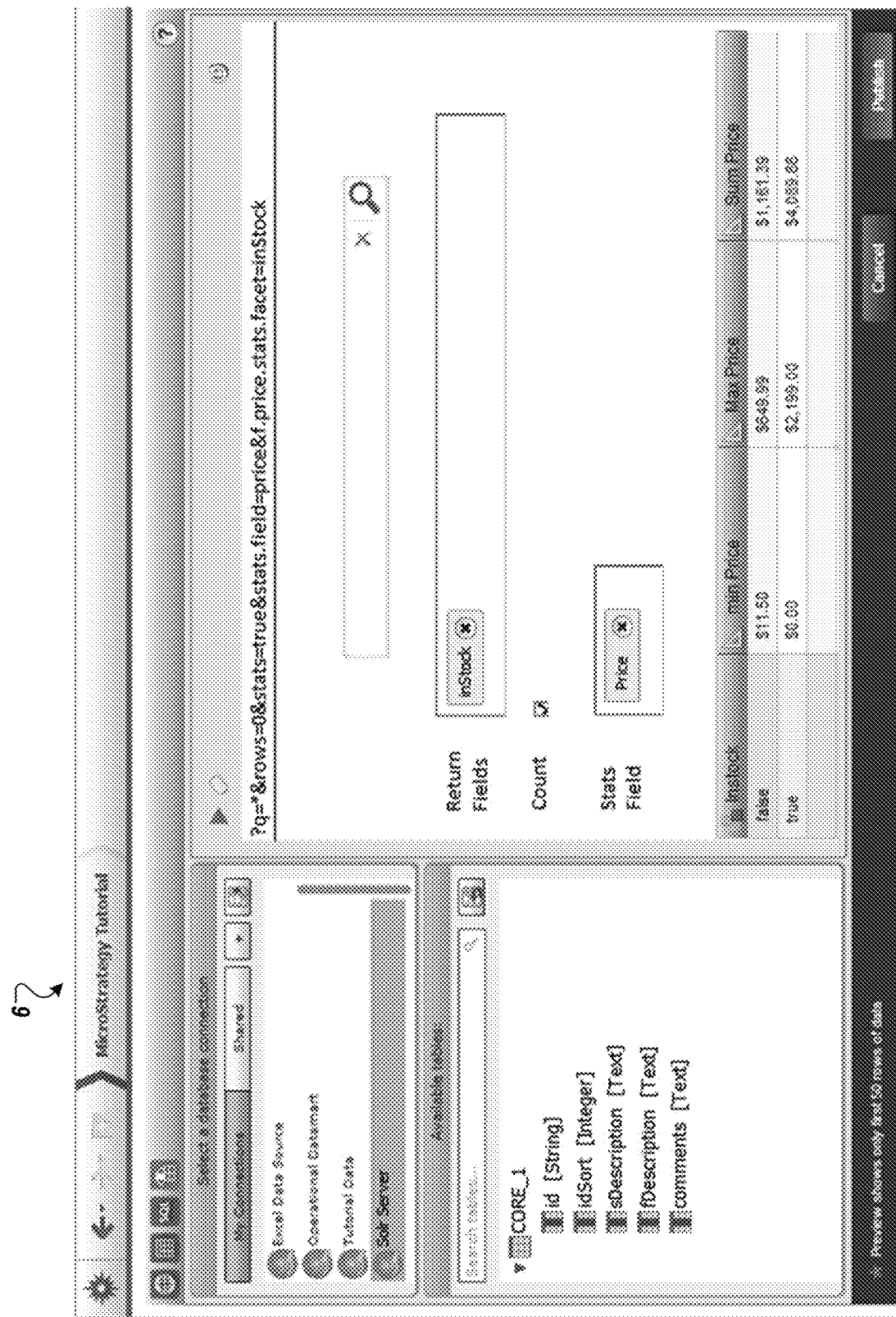
FIG. 3 illustrates another example user interface of a graphical query builder for search.

FIG. 3 illustrates another example user interface of a graphical query builder for search. The user interface 6 may be output by the search system described above. The user interface 6 shows a dynamically-generated search string that is automatically generated based on the text entered in the text input control, the return fields entered in the return fields input control, the count check box, and the stats field. The return fields input control defines facets or fields to be returned by the search. The stats field is a field on which to calculate Sum, Min, Max, etc. If the stats field is left empty, no stats are computed. As shown, the dynamically-generated search string was generated based on no text entered in the text input control, the field "inStock" entered in the return fields input control, the check of the count check box, and the field "Price" entered in the stats field input control.

Figure 4:
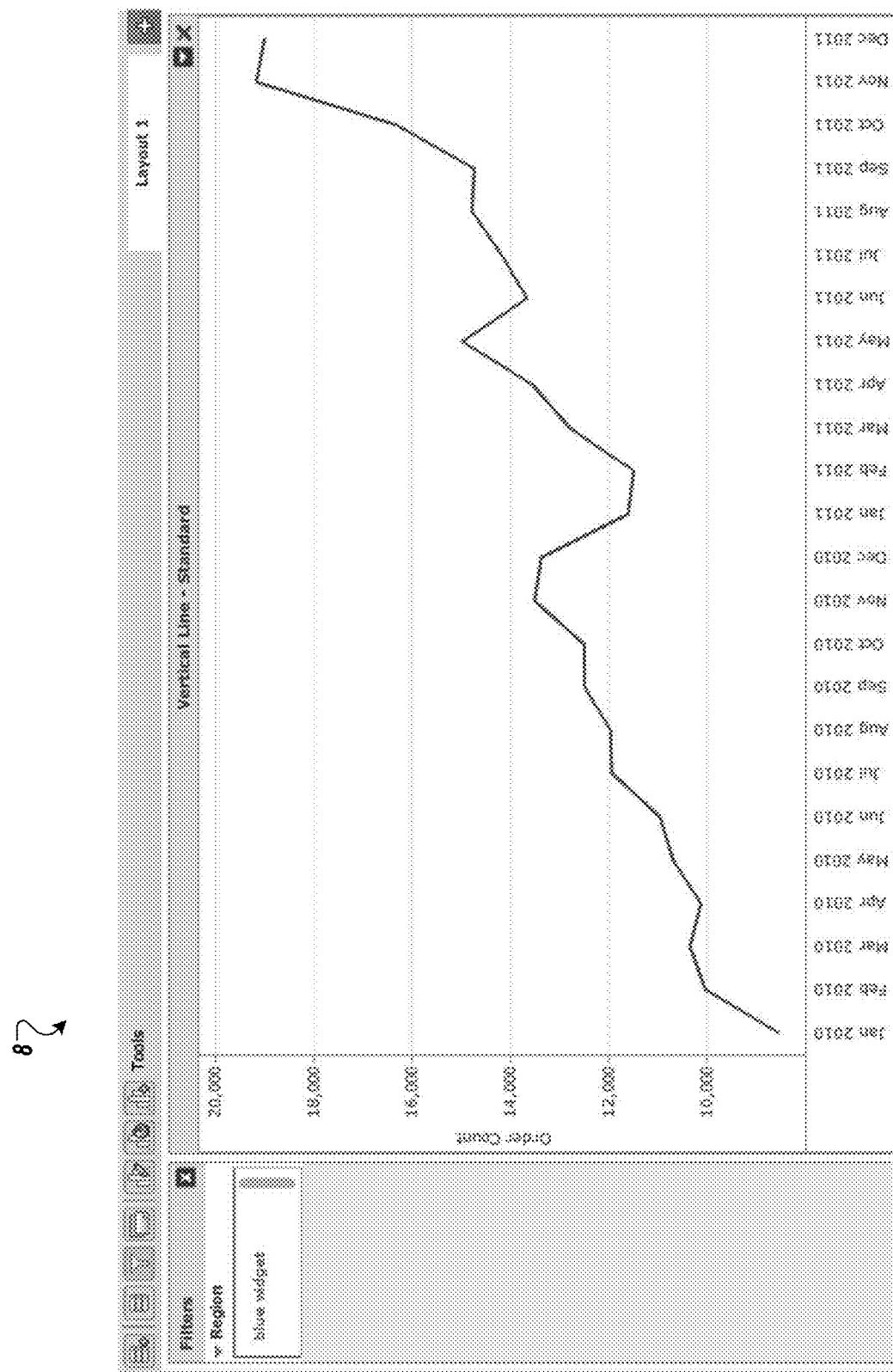
FIG. 4 illustrates an example user interface for search with a search selector for multiple attributes.

FIG. 4 illustrates an example user interface 8 for search with a search selector for multiple attributes. The user interface 8 may be output by the search system described above. The user interface 8 includes a search box that is not specific to any attribute. When search terms are entered in the search box, the system parses the search terms into multiple unit conditions, each of which is an attribute element list qualification, and performs a search based on the parsing.

In some implementations, the system performs natural language processing report or grid creation. In these implementations, the system may receive user input, such as "northeast sales for 2012 by month." The system then generates queries based on natural language processing of the received user input. For instance, for the user input "northeast sales for 2012 by month," the system generates a Template: Month attribute on rows, Sales metric on columns, and a Filter: Region IN {Northeast} AND Year IN {2012}.

Figure 5:
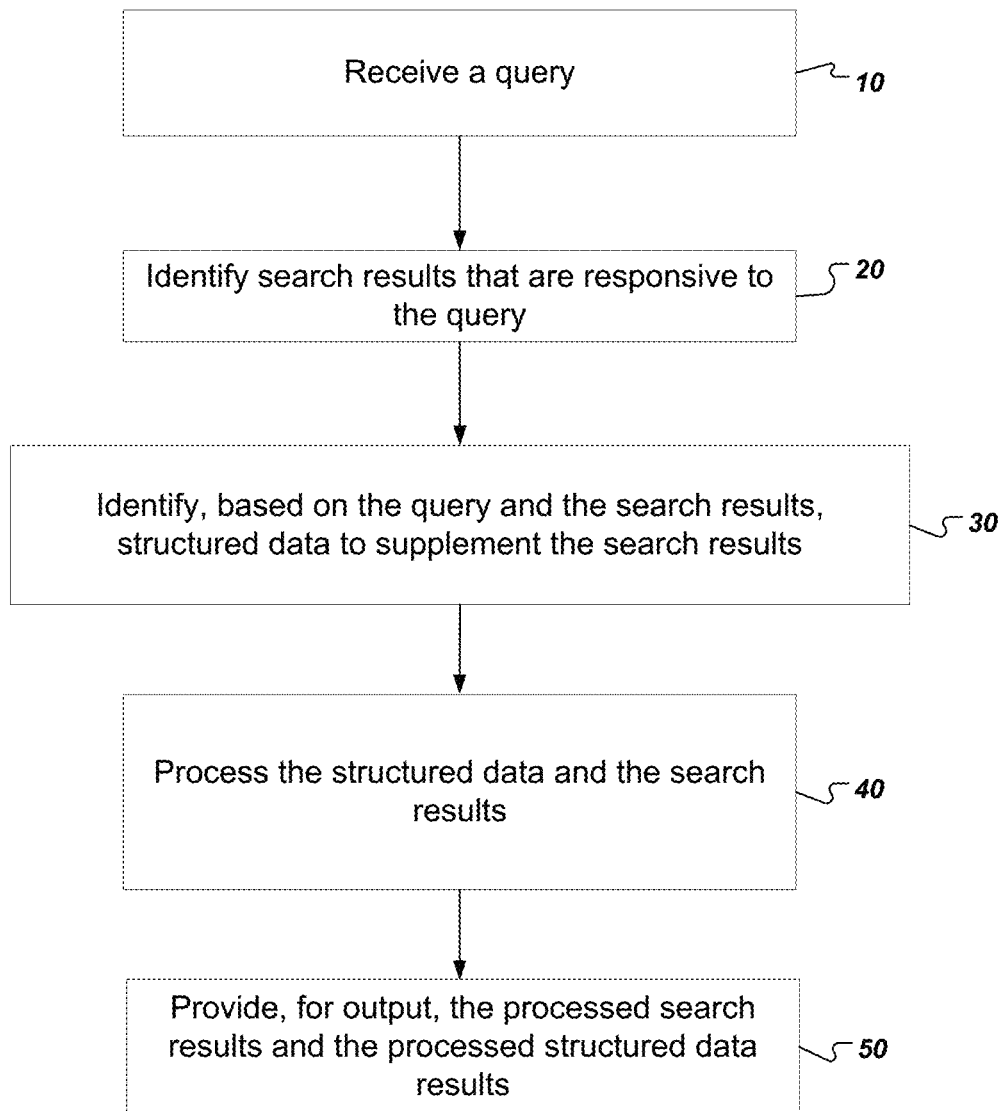
FIG. 5 illustrates an example process for integrating structured data and unstructured data in providing query results.

FIG. 5 illustrates an example process for integrating structured data and unstructured data in providing query results. In general, the process is performed by a computing device, for example, a computer system. The system integrates structured data (e.g., tables in a relational database) and unstructured data (e.g., files indexed by a search index) to identify results to a query.

The system receives a query (10). In some implementations, the query is a natural language query received through a dashboard application. For example, the query may be "identify servers with a buffer overflow error and the impact that error had on each organization." As another example, the query may be "identify customers who included 'not recommend' in their comments."

The system identifies search results that are responsive to the query (20). In some implementations, the system identifies the search results in unstructured or semi-structured search data using a search index. For example, a crawler may have indexed server log files as unstructured or semi-structured search data, and the system identifies, using the search index, the log files that contain the buffer overflow error. As another example, a crawler may have indexed web pages that contain comments left by users of a shopping website unstructured or semi-structured search data, and the system may identify the comments that include "not recommend." Any type of unstructured or semi-structured search data may be searched in satisfying the query.

The system identifies, based on the query and the search results, structured data to supplement the search results (30). For instance, the system supplements the search of the unstructured or semi-structured search data with structured data, such as data from a relational database. For example, to determine the impact of a server error on different organizations, the system identifies structured data that includes a table that maps each server to a particular organization within a company. In this example, through the integration of searching unstructured data and structured data, the system provides search results that indicate the impact of server errors on particular organizations, which is information that is only available through a combination of unstructured and structured data. As another example, the structured data may include a customer database that includes demographic data for each customer who has purchased an item from the shopping website. In this example, the demographic data is added to the results from a search of the unstructured to provide fuller results with more information.

The system processes the structured data and the search results (40). For example, the system may identify the username that is associated with each comment and examine the customer database to determine demographic data of the customers who included "not recommend" in their comment. As another example, the system may identify the organization that was affected by the server error. The system may further identify computer use data for each employee in the organization. The system may compare the employee computer use data for days when the server error occurred to employee computer use data for days when the server error did not occur. In some implementations, the system may perform analytics, filtering, aggregation, wrangling, searching, data mining, text analytics, on demand loading, incremental refreshing, streaming, data blending, complex ETL workflows, or multi-sourcing on the structured data and the search results.

The system provides, for output, the processed search results and the processed structured data results (50). In some implementations, the system provides the processed search results and the processed structured data results to an in-memory engine. The system may request additional processing of the processed search results and the processed structured data results by the in-memory engine. In some implementations, the system provides the processed search results and the processed structured data results to the dashboard application. The system may provide a graphical representation of the processed search results and the processed structured data results such as bar graphs, line graphs, and pie charts.

Figure 6:
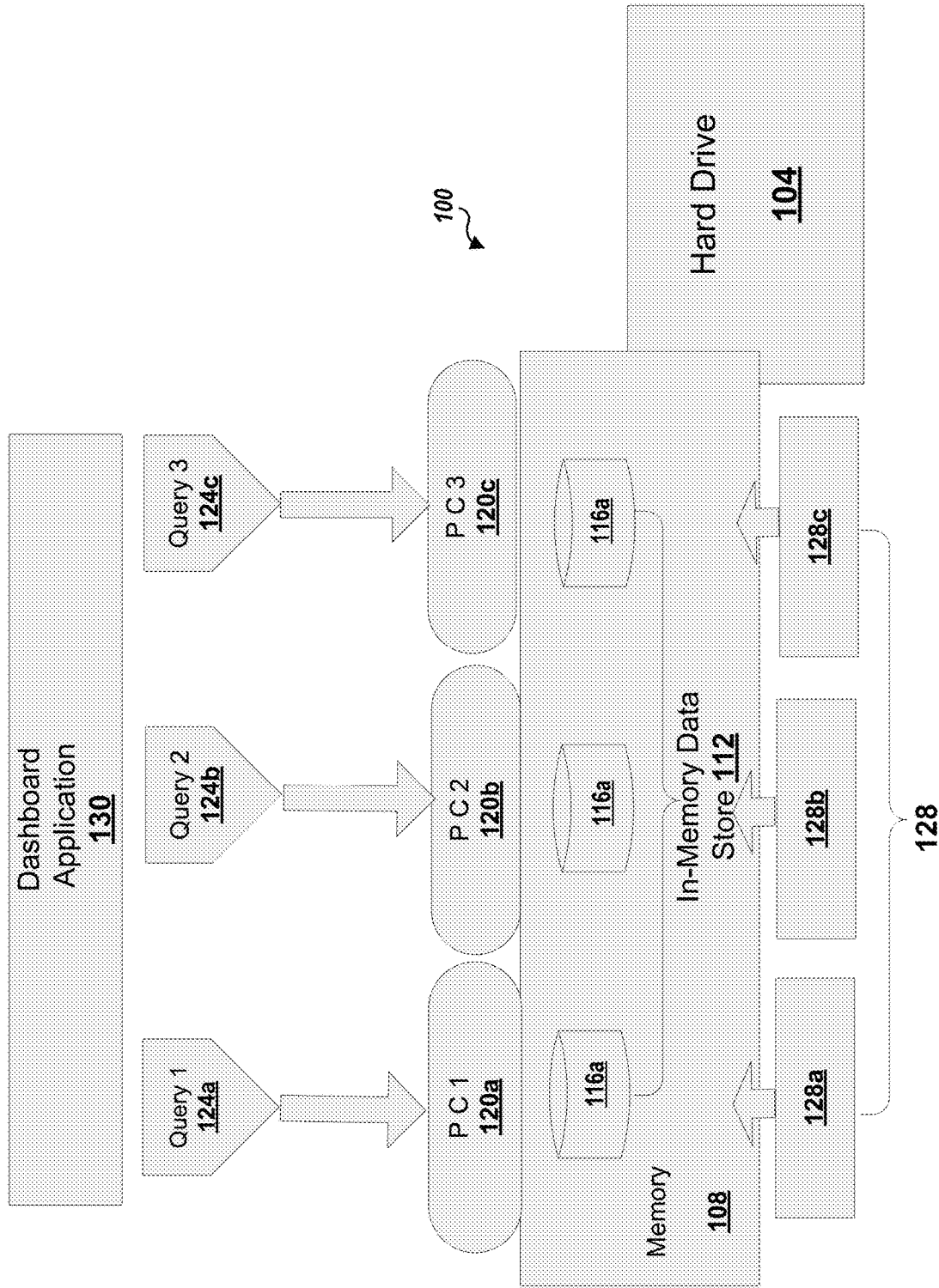
FIG. 6 is a block diagram of an example architecture of an in-memory analytic data store.

FIG. 6 shows an example conceptual diagram of a computer system described as performing the process shown in FIG. 5. For example, computer system 100 can be implemented on one or more computers (or nodes). As shown, computer system 100 can be conceptually represented as having two data storage areas, a hard disk 104 and a memory 108. The computer system 100 includes a dashboard application 130. Dashboard application 130 can include an interface (as described in detail below) for displaying grids and graphs based on underlying data to a user.

For example, memory 108 can be a random access memory or a flash memory. In some implementations, memory 108 allows data items to be read and written in a substantially similar amount of time regardless of an order in which the data items are access. In this regard, memory 108 can be different from, for example, hard disk 104 where the time to read and write data items can vary significant depending on the physical locations of the data items in the recording medium and because of, e.g., mechanical limitations such as media rotation speeds and arm movement delays.

Memory 108 includes an in-memory data store 112. For example, the in-memory data store can be partitioned into one or more data sub sets 116$a$-$c$. For example, one or more data sub sets 116$a$-$c$ can include partitions (e.g. a portion) of one or more tables within data store 112. Although three data sub sets 116$a$-$c$ are shown and described here, there can be fewer or more (perhaps several more) than the three data sub sets 116$a$-$c$. Each data sub set 116$a$-$c$ is associated with one or more processing units 120$a$-$c$. Although three processing units 120$a$-$c$ are shown and described here, there can be fewer or more (perhaps several more) than the three processing units 120$a$-$c$. In some examples, a processing unit 120$a$ can be associated with more than one data sub set 116$a$-$c$.

For example, processing units 120$a$-$c$ can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 100 can be implemented across multiple nodes. For example, a first processing unit 120$a$ can each be a processor core of a multi-core processor in a first node, and a second processing unit 120$b$ can be a processor core of a multi-core processor in a second, different, node. In some implementations, while processing unit 120$a$ is physically located in a first node (e.g. a first processor core in the first node), processing units 120$b$ and 120$c$ can be physically located in a second, different node (e.g. second, different processor cores in the second node). In some implementations, data sub set 116$a$ can be physically located in the first node, and data sub sets 116$b$ and 116$c$, corresponding respectively to each of processing units 120$b$ and 120$c$, can be physically located in the second, different node. Although a few example combinations of processor cores and partitioned data sets are described here, a person of ordinary skill in the art would understand that any number of combinations of processor cores and partitioned data sets, spread out over a single node or multiple nodes, are possible.

In some examples, one or more database transactions can be processed in the form of one or more queries 124$a$-$c$ to the in-memory analytic data store 112. For example, a high level database transaction can be divided into the multiple queries 124$a$-$c$. In some examples, the number of queries 124$a$-$c$ can be as high as a number of parallel processing units 120$a$-$c$ that are available to process the queries 124$a$-$c$ in parallel. As shown, the queries 124a-c can be processed in parallel by the respective processing units 120a-c. For example, query 124a may require the summation of a column of data (e.g., numbers) residing in a portion of the data sub set 116a. For example, the column of data relates to sales made by a customer over a period of time. This summation operation can be handled by respective processing unit 120a. Substantially at the same time, a different (but perhaps related) operation, e.g. retrieving transaction dates for the sales fields being processed through the summation operation, can be handled by processing unit 120b operating on data sub set 116b. The results from respective queries 124a and 124b can be sent back to a query engine (see e.g. FIG. 3 described in further detail below) to assemble the information for, e.g., final display. In some implementations, the second simultaneous operation is typically the same as the first and a single logical operation is divided among multiple partitions. For example, the operation may be to sum a group of 100 numbers, but physically there are 5 operations, each of which sums a group of 20 of the 100 numbers. Therefore, each operation is a sum.

For example, computer systems implementing the techniques described herein (e.g. computer system 100 of FIG. 6) uses information about an application and/or design aspects of a dashboard application 130 to generate queries 124a-c to the in-memory data store. For example, dashboard application 130 can include a dashboard interface, as described in detail below, in which two or more grids (e.g. tables of data) are based on same or similar content. In some implementations, the computer system 100 can cause a single combined query (e.g., only query 124a) or parallel queries (e.g., queries 124a-c) to be executed on the in-memory data store for the two or more grids. In some implementations, dashboard application 130 can have two visualizations representing, e.g. sales trends over time through both a line chart and a grid of data. In the computer system 100, the data needed for the two visualizations can be the same and so can be based on a either a single query or multiple parallel queries to in-memory analytic data store 112. In some examples, dashboard application 130 can include two visualizations (not shown) based on selecting key performance indicators (KPIs) from a same set of underlying data in in-memory data store 112. Because the underlying data involved is the same, the visualizations can be executed together—i.e. a single query or multiple parallel queries can be executed together. In some implementations, dashboard application 130 can include visualizations that are based on same or similar filtering criteria, and as such queries corresponding to these visualizations can be combined into a single query and/or executed together.

In some implementations, a data service engine 128 can receive data from multiple high volume data storage systems and load the received data into in-memory data store 112. In some examples, data service engine 128 can perform parallel data loading into data store 112 through parallel processes 128a-c. For example, processes 128a-c can load data from a corresponding data sources (not shown) into respective in-memory data store sub sets 116a-c in parallel. In some implementations, the loaded data can be all of the market intelligence data needed to generate output for an end application, e.g., a dashboard/visualization engine as described in further detail below.

The in-memory analytic data store 112 can enable bigger data volume given its partitioned and parallel processing structure. For instance, current in-memory technologies are limited to two billion rows. By dividing datasets into partitions (e.g., data store sub sets 116a-c), each partition or sub set 116a-c can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multiprocessor node. For multiple node partitioning, data partitions are distributed within and across multiple nodes (e.g., machines) and queries processed in parallel within and across multiple nodes.

In some implementations, the in-memory analytic data store 112 can provide broader analytic functionality. For instance, current in-memory cubes do not support full filter and metric functionality. In current in-memory cubes, "single pass" queries can be executed on underlying data. As such, complex business questions, such as, returning regional sales for those customers that bought certain widgets worth more than a predetermined number, could not be run on the data. The in-memory analytic data store 112, however, extends to "multi-pass" analytics with multiple levels of aggregation and/or filtering. For example, computer system 100 can process metrics having conditions. In some examples, computer system 100 can also set qualification filters on the data.

Figure 7:
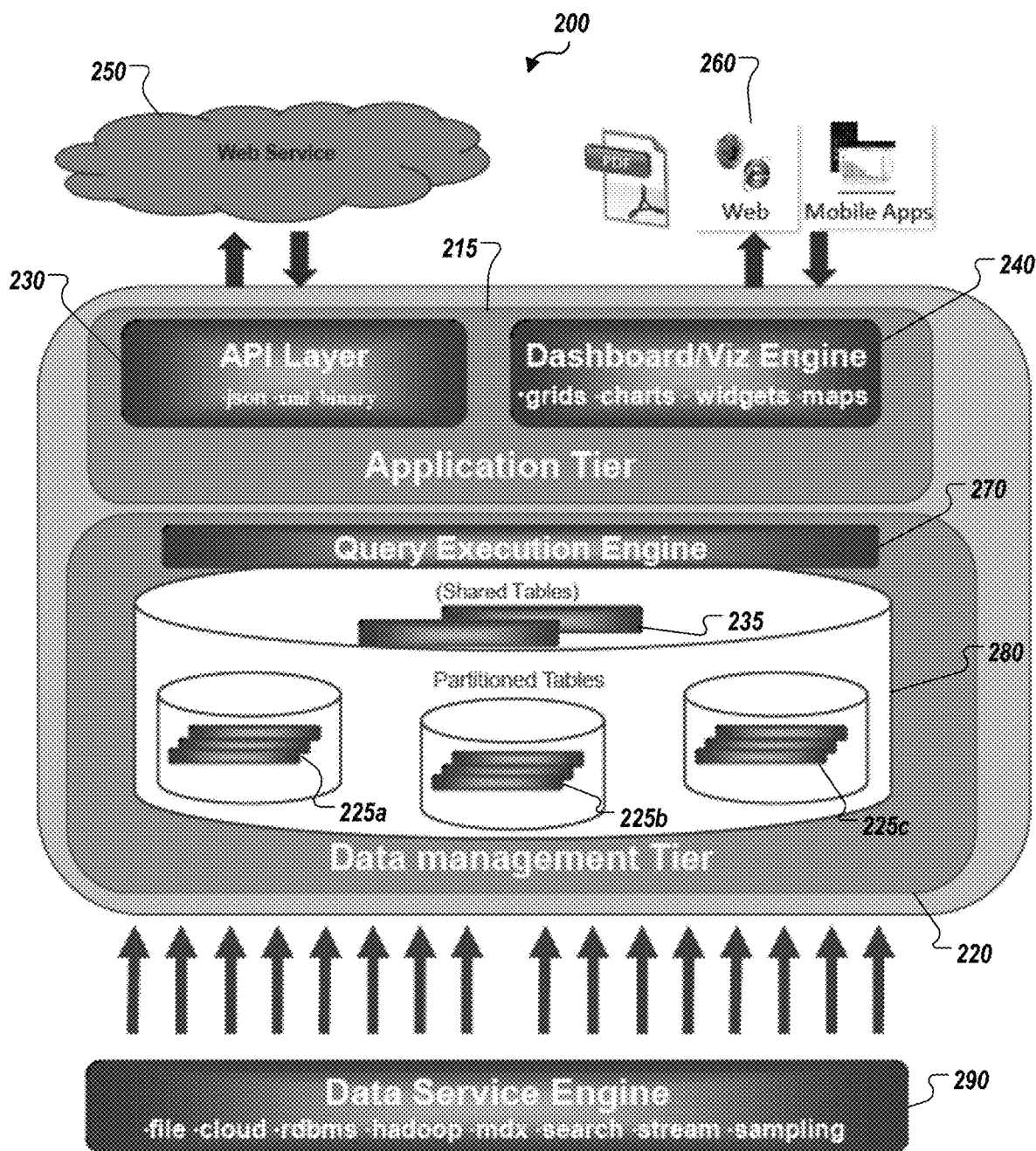
FIG. 7 is a block diagram illustrating an example architecture of a node.

In some implementations, the computer system of FIG. 6 can be implemented on a single node. Referring to FIG. 7, an example architecture of a single node 200 is shown. Node 200 can be a server implementing an in-memory analytic data store 280. Node 200 can include an application tier 215, a data management tier 220, and a data service engine 290. Application tier 215 includes an application programming interface (API) layer 230 and an intelligence dashboard/visualization engine 240. For example, API layer 230 includes specifications describing how components in data management tier 220 can interact with other components, e.g., one or more web services 250. For example, API layer 230 interfaces with web services 250 to receive data from one or more other applications (e.g., market intelligence data) and/or to provide collaborative functionality with the one or more other applications (e.g., receive user input from the one or more other applications and provide data to be output by the one or more other applications).

Figure 9:
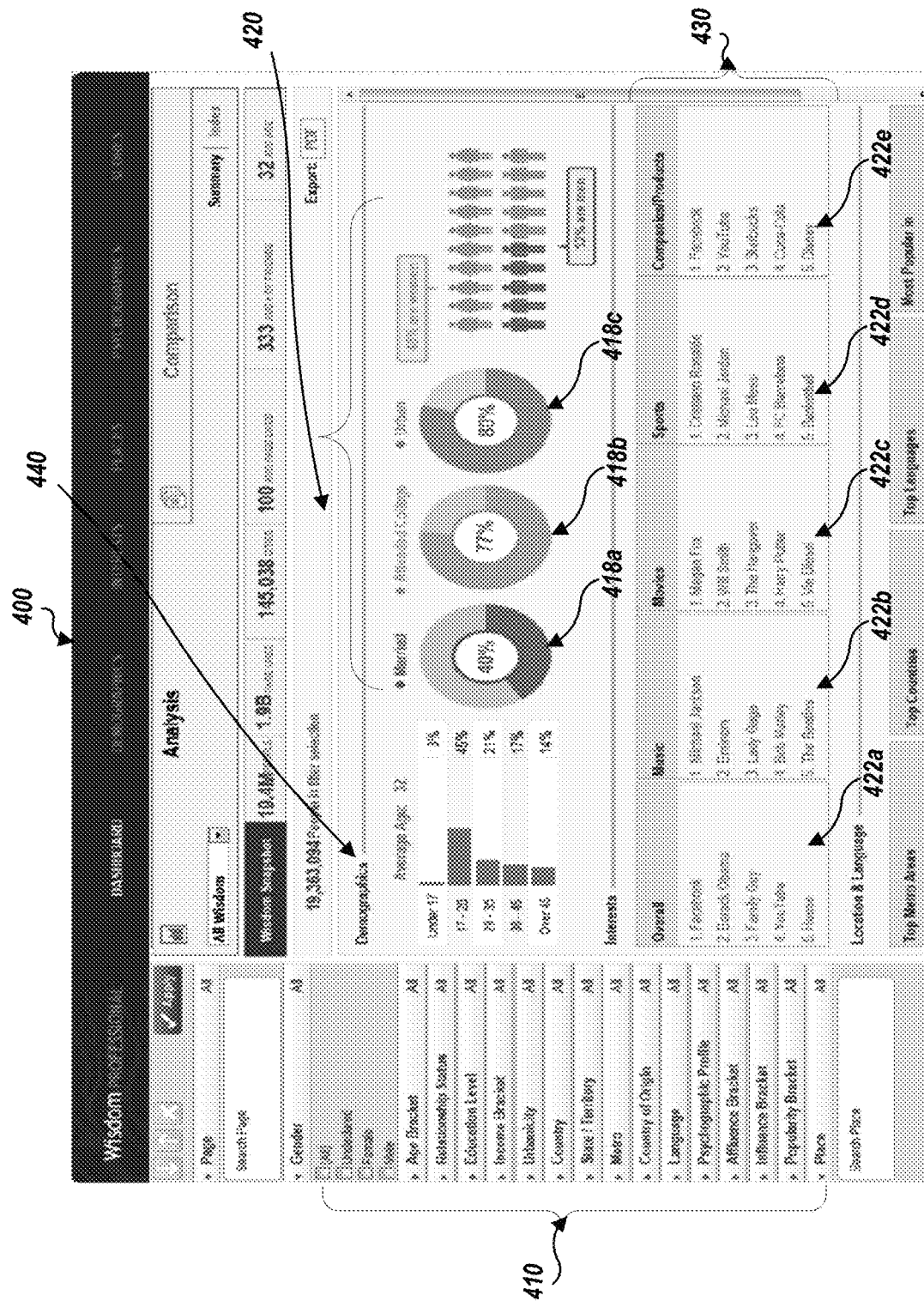
FIGS. 9 and 10 illustrate example user interfaces of an intelligence dashboard.

Dashboard/visualization engine 240 interacts with one or more of web applications, mobile applications, and documents 260 to receive user input and provide user output. For instance, dashboard/visualization engine 240 can generate a user interface 400 as shown in FIG. 9. For example, dashboard/visualization engine 240 can interact with a web or mobile application to output the user interface 400 on a user's device, e.g. a handheld device. Dashboard/visualization engine 240 also can output user interface 400 as a document or file that a user device is able to store and display. Application tier 210 can be a tightly-coupled with globally optimized query execution across multiple visualizations in single dashboard. Application tier 210 can also include a "data-only" JSON REST API and can provide super-fast search-style selectors.

Data management tier 220 can include a query execution engine 270 and an in-memory data store 280. Query execution engine 270 receives queries (similar to queries 124a-c described in connection with FIG. 6) from application tier 210 and processes the received queries on data stored in in-memory data store 280. Query execution engine 270 can access data from the in-memory data store 280, perform analytics on the accessed data, and provide, to the application tier 215, the accessed data and/or the results of the performed analytics. In some implementations, query execution engine 270 can divide a database transaction into a plurality of queries for processing on the respective data partitions.

In-memory data store 280 can be partitioned as shown. In some implementations, in-memory data store 280 can be partitioned to include, e.g., multiple partitioned tables 225a-c and one or more shared tables 235 that are stored in-memory. In some implementations, while each of the partitioned tables 225a-c is associated with a corresponding processor core, shared tables 235 can be accessed by multiple processor cores at substantially the same time. For example, the in-memory data store 280 can include a customer transactions table that can be partitioned such that each of the partitioned tables 225a-c has one million customer transaction entries. In some implementations, a shared table can be a customer table that is shared among two or more processor cores.

Query execution engine 270 is configured to process queries to multiple partitioned tables 225a-c and one or more shared tables 235 in parallel to provide fast data retrieval and enable a larger volume of data to be stored in-memory. For example, partition tables 225a-c can include a plurality of customer transaction records. Data management tier 220 can be a high-performance in-memory data tier that performs distributed in-memory analytics on the customer transaction records.

As explained above, data management tier 220 can have data partitioned across multiple processing cores and can perform parallel execution of queries across all cores according to a partition logic. In some implementations, a partition attribute can be defined to couple the processing cores to the respective data partition table e.g., any one of partition tables 225a-c. For example, if a partition table 225a contains customer transaction information, a customer transaction attribute such as a transaction identification code ("ID") can be used as a partition attribute. In this regard, in some examples, the transaction ID can be processed through a hash function and sent to partition tables 225a-c to determine which partition 225a-c has the corresponding transaction information. In some implementations, while multiple customers can be located in a partition table 225a, a customer located on partition table 225a can remain on that partition table 225a indefinitely (e.g., until the customer record is reallocated elsewhere).

Data service engine 290 can receive data from multiple high volume data storage systems and load the received data into the in-memory data store 280 in the data management tier 220. The data service engine 290 can perform parallel data loading into the in-memory data store 280 from multiple data sources. The loaded data can be all of the market intelligence data accessible to generate output through the dashboard/visualization engine 240. For example, data service engine 290 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information.

In some implementations, any arbitrary schema can be loaded into the in-memory analytic data store. In some implementations, the in-memory analytic data store 280 can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the in-memory analytic data store. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the in-memory analytic data store 280 can be loaded with all such star schemas.

Figure 8:
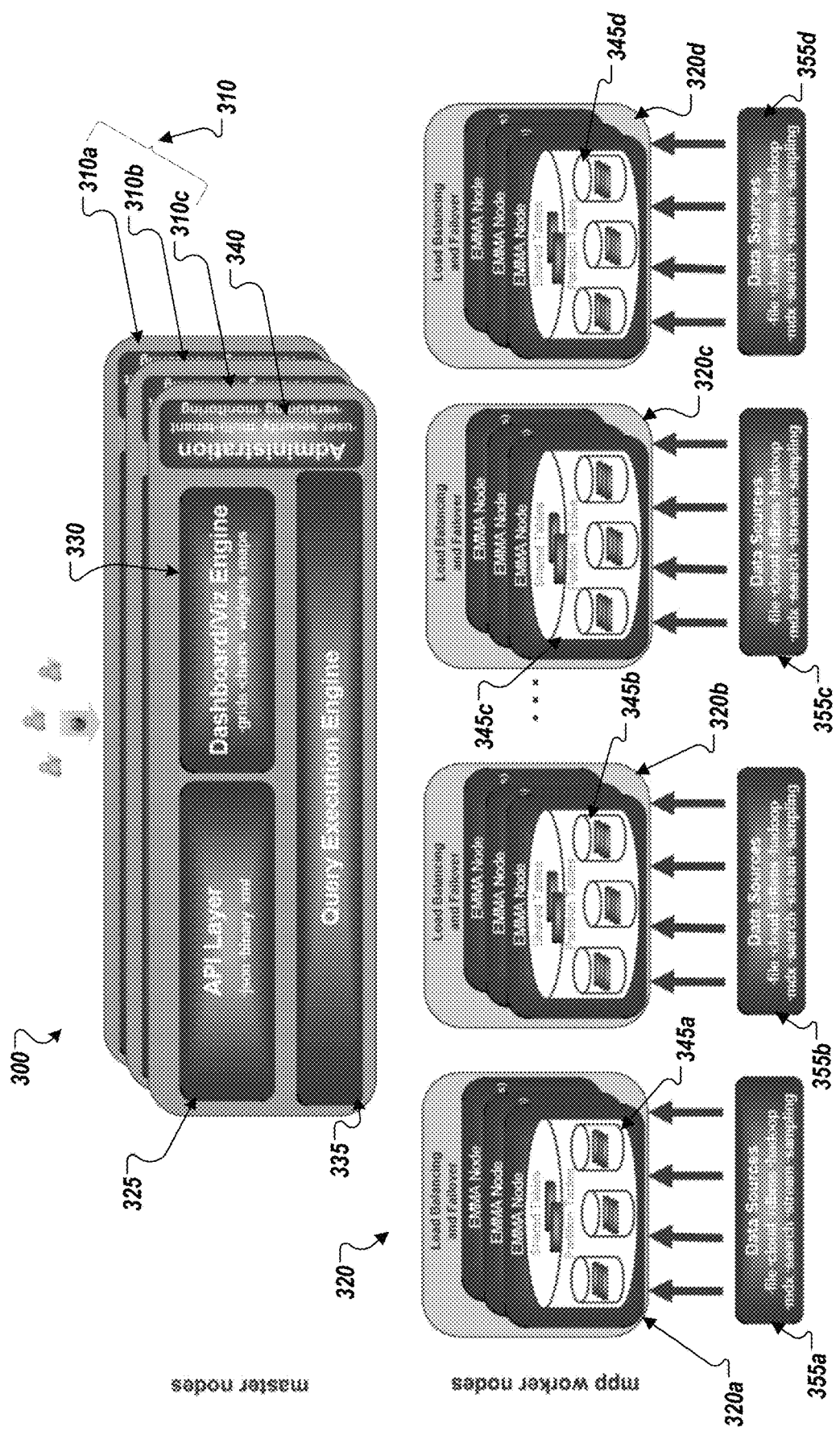
FIG. 8 is a block diagram illustrating an example system with multiple nodes.

FIG. 8 illustrates an example system 300 with multiple nodes 310, 320. The system 300 includes master nodes 310, further delineated as master nodes 310a-c, and worker nodes 320, further delineated as worker nodes 320a-d. Although FIG. 8 illustrates three master nodes 310a-c and four worker nodes 320a-d, the system 300 can include more (perhaps, many more) or fewer master nodes 310a-c and worker nodes 320a-d.

As shown, each of the master nodes 310a-c includes an API layer 325, a dashboard and/or visualization engine 330, a query execution engine 335, and an administration engine 340. The API layer, dashboard/visualization engine 330, and query execution engine 335 can be similar to the API layer 230, the dashboard/visualization engine 240, and the query execution engine 270 described above with respect to FIG. 7, except with for query execution engine 270 operating over multiple, different worker nodes 320a-d. Administration engine 340 handles administration functionality for the corresponding master node 310, including user security, multi-tenant administration, versioning, and process monitoring. Each of master nodes 310a-c can be operated on a separate machine.

As shown, each of the worker nodes 320a-d includes a corresponding in-memory analytic data store 345a-d, each of which can be similar to the in-memory data store 280 described above with respect to FIG. 7. Each of worker nodes 320a-d can perform load balancing and failover operations for its own in-memory analytic data store nodes and/or across all of the worker nodes 320. In this regard, in some implementations, a status of a node is monitored. If, for example, a node (or a core within the node) fails or the load on a node (or a core within the node) exceeds a predetermined maximum, its load is immediately redistributed across the remaining nodes (or cores). For example, if an abnormal condition state is detected with respect to one or more nodes (or cores in the nodes), a failover can be effected to another one of the plurality of nodes (or processor cores) to ensure continued operation.

Each of the worker nodes 320a-d can receive data from multiple large volume data sources and load the received data in parallel as described above. For example, each worker node 320a-d can be in communication with one or more corresponding data sources 355a-d. Although FIG. 8 illustrates a one-to-one correspondence between worker nodes 320a-d and data sources 355a-d, it should be understood that any variation of relationships between the worker nodes 320-a-d and data sources 355a-d is possible. For example, a single data source, e.g., data source 355a (say, a Hadoop system), can provide data to all four worker nodes 320a-d. The data sources 355a-d can include high volume data storage systems. Accordingly, a data services engine (e.g. data service engine 290 of FIG. 7) can load data from the data sources 355a-d in parallel into the in-memory data stores 345a-d. In some implementations, the loaded data can be all of the market intelligence data needed to generate output through a dashboard/visualization engine.

In some implementations, the raw data from one or more information sources, e.g., a Hadoop system, can be processed before being loaded (e.g. via data service engine 290 of FIG. 7) to an in-memory analytic data store. An example implementation of an interface for such processing is described in U.S. provisional Application No. 61/932,099, filed Jan. 27, 2014.

The system 300 can be configured differently depending on the type of application and the amount of data needed to support the application. For instance, for a market intelligence application that uses 2.2 billion rows, the system 300 can have a memory footprint of 59 GB and can have a hardware configuration of a single server with 32 cores and 1 TB of RAM. For a social media application that uses 2.8 billion rows, the system 300 can have a memory footprint of 100 GB and can have a hardware configuration of a single server with 40 cores and 1 TB of RAM. For an e-commerce application that uses 3.8 billion rows, the system 300 can have a memory footprint of 500 GB and can have a hardware configuration of a single server with 80 cores and 1 TB of RAM. For a social media application that uses 80 billion rows, the system 300 can have a memory footprint of 5-6 TB and can have a hardware configuration of 100 worker nodes, each with 16 cores and 144 GB of RAM, which results in a total of 1600 cores and 14 TB of RAM.

The system 300 can be configured to support use case characteristics with data volume in the 100's of GB to 1 TB range. In these cases, the system 300 can provide fast response time, as all executions are against in-memory datasets and datasets and queries are partition-friendly. The system 300 can serve mostly external-facing applications, although some applications can be internal. The data volume that can be handled by system 300 may not be limited to a particular size, such as 1 TB. In fact, depending on the available nodes in system 300, a variety of data volumes can be serviced by system 300.

FIG. 9 illustrates an example user interface 400 of an intelligence dashboard. As shown, interface 400 comprises a plurality of control objects 410-440. For example, control objects include grids (e.g. data displayed in table format), graphs, text fields, shapes, etc. that users can use to navigate through the data presented through interface 400. Interface 400 can be powered by the in-memory analytic data store described throughout this disclosure (e.g., in-memory analytic data store 112 of FIG. 6). In this regard, in some implementations, the analytic data store powers an extensive market intelligence network that provides the data shown in user interface 400. For example, computer systems implementing the techniques described herein (e.g. computer system 100 of FIG. 6) uses information about an application and/or design aspects of dashboard 400 to generate queries to the in-memory data store.

For example, all of the market intelligence data used by and displayed through the intelligence dashboard interface 400 can be loaded into the in-memory analytic data store. In this example, user interface 400 receives user input defining filter criteria 410 related to the market intelligence information a user seeks. Filter criteria 410 can include demographics data or any other type of data as shown in interface 400 or otherwise available to filter the market intelligence data stored in the in-memory analytic data store. For example, the user may be able to filter the data by gender, age, relationship status, education level, income bracket, urbanicity, etc. A query execution engine (e.g. query execution engine 270 of FIG. 7) can receive the user input defining filter criteria 410, and execute queries (e.g. queries 124a-c of FIG. 6) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 400.

As shown in FIG. 9, the user interface 400 specifies the demographic data used to generate the dashboard output broken down into various categories 420 (e.g. as shown in charts 418a-c) and outputs ranked lists of interests 422-a-e for people that fall within the demographic profile 440 defined by the filter criteria 410. For example, the categories 420 can include what percentage of the relevant population is married, has attended college, or lives in an urban area. Other types of output and data visualization can be used. In addition, the user interface 400 can receive additional user input to refine or change the filter criteria 410 or the results sought and the user interface 400 can dynamically update in short order given the in-memory data retrieval and processing that occurs responsive to the additional user input.

By way of example, FIG. 6 shows a user interface 500 of an intelligence dashboard also powered by an analytical in-memory data store (e.g., in-memory analytic data store 112 of FIG. 6). Interface 500 displays a customer report 505 to, e.g., a sales associate in a retail store. In an example, the sales associate can view the customer report 505 on a store computer.

In some examples, graphical user interface 500 includes customer portion 520 that displays information indicative of customers who are, e.g. in a particular geographic location (say, the retail store). Customer portion 520 displays customer information 520a-520h, with each item of customer information 520a-520h representing a customer. A user can select customer information 520a-520h by, for example, using a mouse to click on, or using a touch screen display to touch, a desired item of customer information 520a-520h. When an item of customer information 520a-520h is selected, interface 500 displays information pertaining to the selected customer. In the interface 500 of FIG. 10, a viewer of graphical user interface 500, e.g., the sales associate, has opted to view information associated with the customer represented by customer information 520a.

A query execution engine (e.g. query execution engine 270 of FIG. 7) can receive the user input, e.g., selection of customer information 520a-520h, and execute queries (e.g. queries 124a-c of FIG. 6) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 500.

As shown, interface 500 includes past purchases link 502, selection of which causes interface 500 to display information indicative of past purchases of the customer that is selected via customer portion 520. Interface 500 also includes suggested items link, selection of which causes interface 500 to display suggestions information 504 indicative of suggested items that a particular customer (e.g., the customer selected from customer portion 520) may be interested in and want to purchase. Suggestions information 504 can based on analyzing data that is retrieved from an in-memory analytic data store. For example, suggestions information 504 can be based on customers' past purchases. Interface 500 includes shopping bag link 506, selection of which causes graphical user interface 500 to display items that a particular customer wishes to purchase. Interface 500 includes profile link 508, selection of which causes interface 500 to be updated to display a customer profile of a particular customer (e.g., the customer selected via currently present customer portion 520).

Interface 500 includes top occasions portion 510 that displays information (e.g., a graph) indicative of the top occasions for which a particular customer (e.g., customer 520a) has purchased merchandise. Information for top occasions portion 510 can be generated based on analytics performed on market intelligence data contained in an in-memory data store. In this example, top occasions portion 510 is generated by tracking past purchases of the customer and then categorizing the types of purchase (e.g., based on various occasions). In another example, top occasions portion 510 displays information indicative of the top occasions for a group of customers, e.g., rather than displaying the top occasions for a particular customer.

Interface 500 also displays top categories information 512, e.g., information specifying top categories of goods that have been purchased by a particular customer and/or by a group of customers at a retail store. Information for top categories portion 510 can be generated based on analytics performed on market intelligence data pertaining to the particular customer and/or the group of customers contained in an in-memory data store. In some implementations, interface 500 can include basket analysis portion 514—for display of information indicative of types of goods that are currently in an electronic shopping cart of a customer.

Graphical user interface 500 also includes spending history portion 516 to display information indicative of how much money a particular customer (e.g., the customer selected in portion 520) has spent with the retailer over a period of time. Information for spending history portion 516 can be generated based on analytics performed on market intelligence data pertaining to the particular customer contained in an in-memory data store. Spending history portion 516 can include a timeline 516a, e.g., a representation of the period of time over which spending is tracked. Spending history portion 516 also includes information 516b that specifies an average amount of money a particular customer has spent with the retailer over a period of time. Interface 500 also includes portion 518 for display of information indicative of past purchases and/or transactions of a particular customer.

Figure 11:
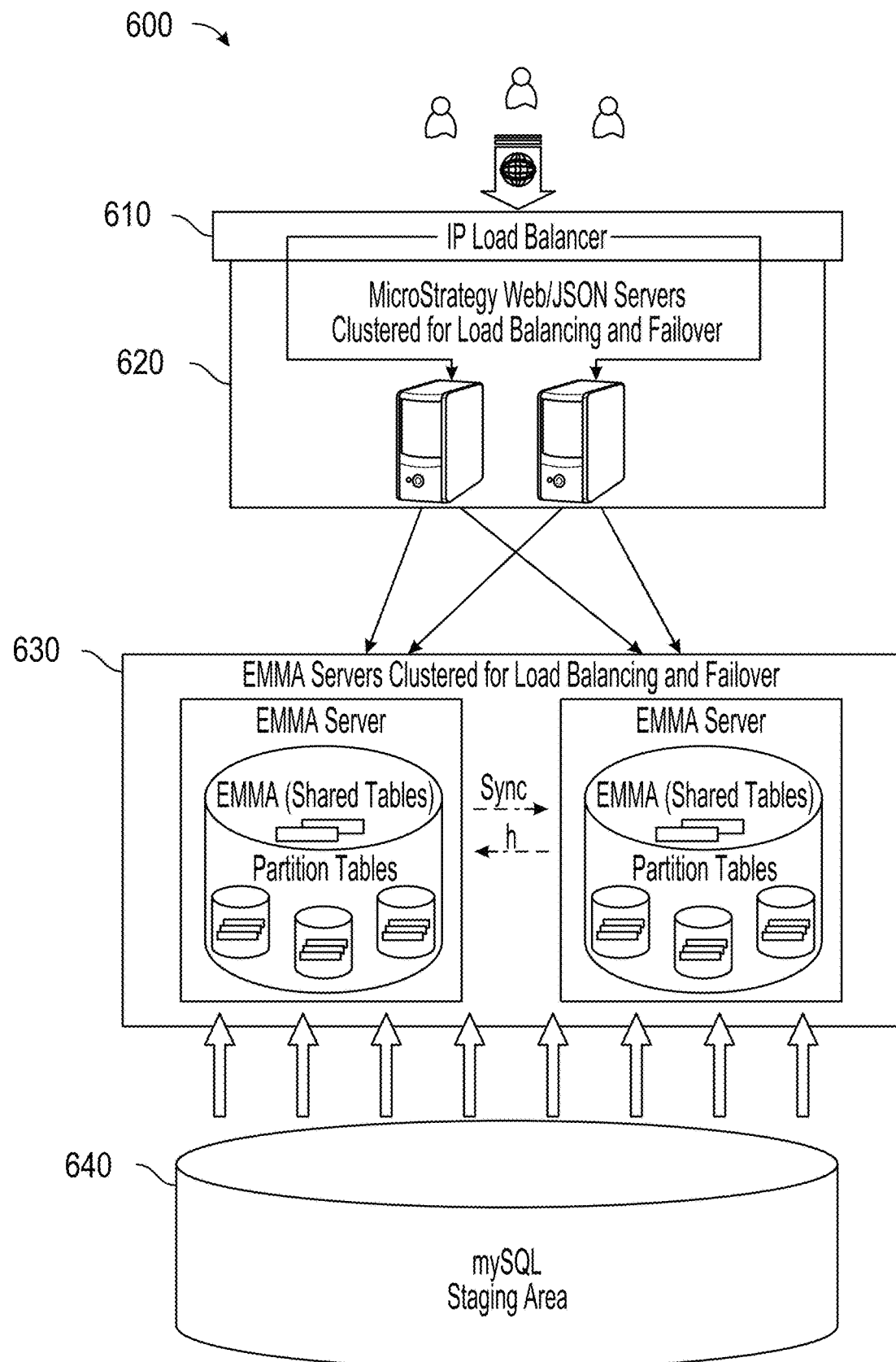
FIGS. 11 and 12 are block diagrams illustrating example topologies for applications leveraging an in-memory, distributed, analytic data store.
Figure 12:
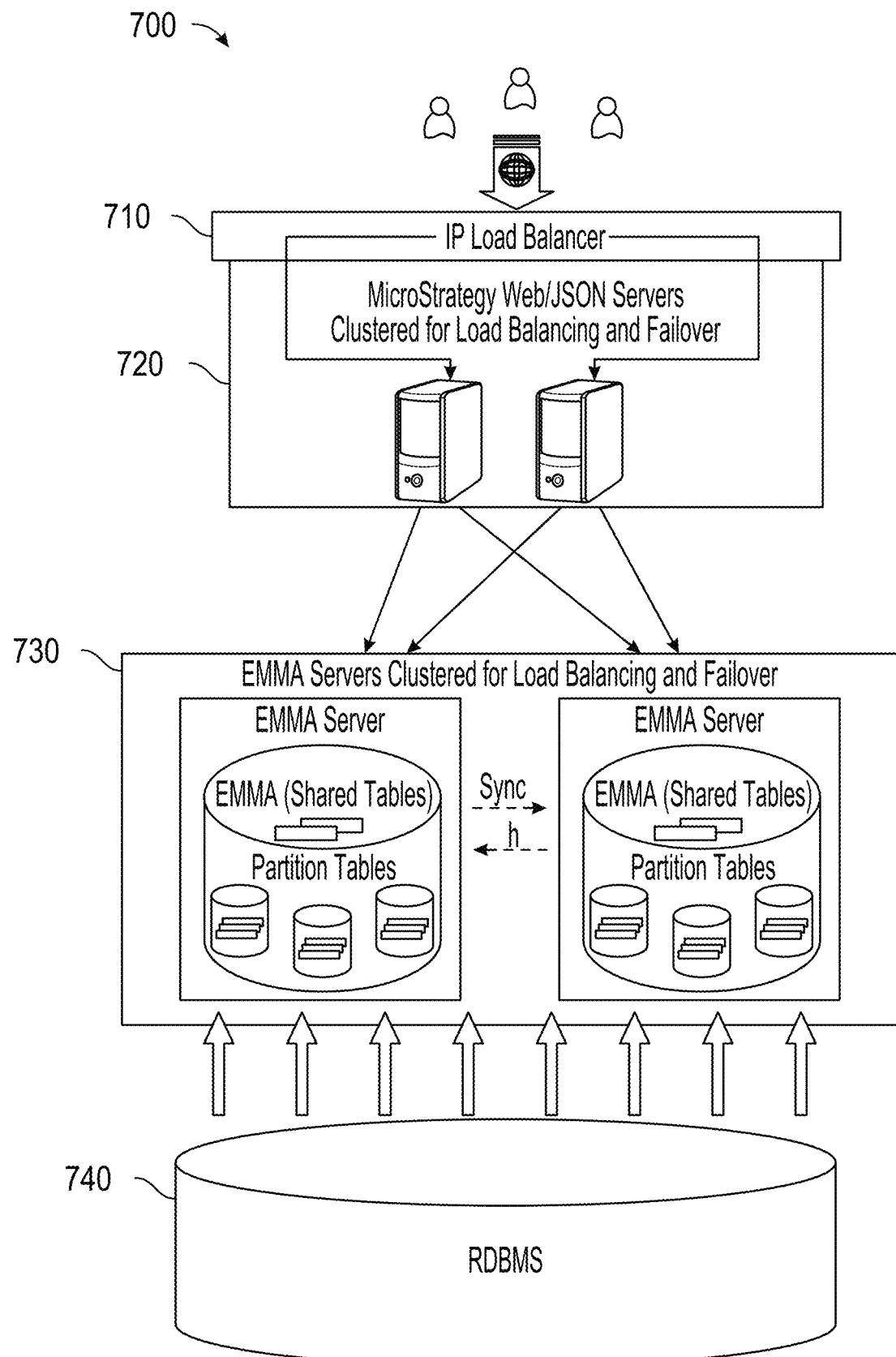

FIGS. 11 and 12 illustrate example topologies for applications leveraging an in-memory, distributed, analytic data store. In FIG. 11, an example topology 600 includes an Internet Protocol (IP) load balancer 610, multiple web server nodes 620, multiple in-memory analytic data store nodes 630, and a data staging area 640. The IP load balancer 610 receives user requests over the Internet and balances the user requests across the web server nodes 620. The web server nodes 620 process the user requests and access data needed to serve the user requests from the multiple in-memory analytic data store nodes 630. Each web server node can use the operating system RHEL 6.2, can have a 12 core Intel Xeon @ 2.24 GHz central processing unit, and can have 32 GB of RAM.

The multiple in-memory analytic data store nodes 630 store data in a partitioned manner and perform parallel processing of the partitioned data. The multiple in-memory analytic data store nodes 630 are clustered for load balancing and failover and serve queries/requests from the web server nodes 620. The multiple in-memory analytic data store nodes 630 communicate with one another to perform synchronization of changes made to the dataset. Each in-memory analytic data store node can use the operating system RHEL 6.2, can have a 32 core Intel Xeon @ 2.24 GHz central processing unit, and can have 1 TB of RAM. The full dataset can be replicated on each server.

The data staging area 640 accesses data to be loaded into the in-memory analytic data store nodes 630. The data staging area 640 stages the data in a manner that enables parallel loading of the data into the in-memory analytic data store nodes 630.

In FIG. 12, an example topology 700 includes an IP load balancer 510, multiple web server nodes 720, multiple in-memory analytic data store nodes 730, and a relational database management system (RDBMS) 740. The IP load balancer 710 receives user requests over the Internet and balances the user requests across the web server nodes 720. The web server nodes 720 process the user requests and access data needed to serve the user requests from the multiple in-memory analytic data store nodes 730. Each web server node can use the operating system Windows Server 2003 Enterprise x64 Edition (SP2), can have a Quad Core Intel Xeon L5520 @ 2.27 GHz central processing unit, and can have 6 GB of RAM.

The multiple in-memory analytic data store nodes 730 store data in a partitioned manner and perform parallel processing of the partitioned data. The multiple in-memory analytic data store nodes 730 are clustered for load balancing and failover and serve queries/requests from the web server nodes 720. The multiple in-memory analytic data store nodes 730 communicate with one another to perform synchronization of changes made to the dataset. Each in-memory analytic data store node can be a model Sun Fire X4800 M2 server, can use the operating system RHEL 6.1, can have an 80 core Intel Xeon @ 2.40 GHz with hyper threading central processing unit, and can have 1 TB of RAM. The full dataset can be replicated on each server.

The RDBMS 740 stores data to be loaded into the in-memory analytic data store nodes 730. In some implementations, the RDBMS 740 loads data into the in-memory analytic data store nodes 730 in parallel.

Figure 13:
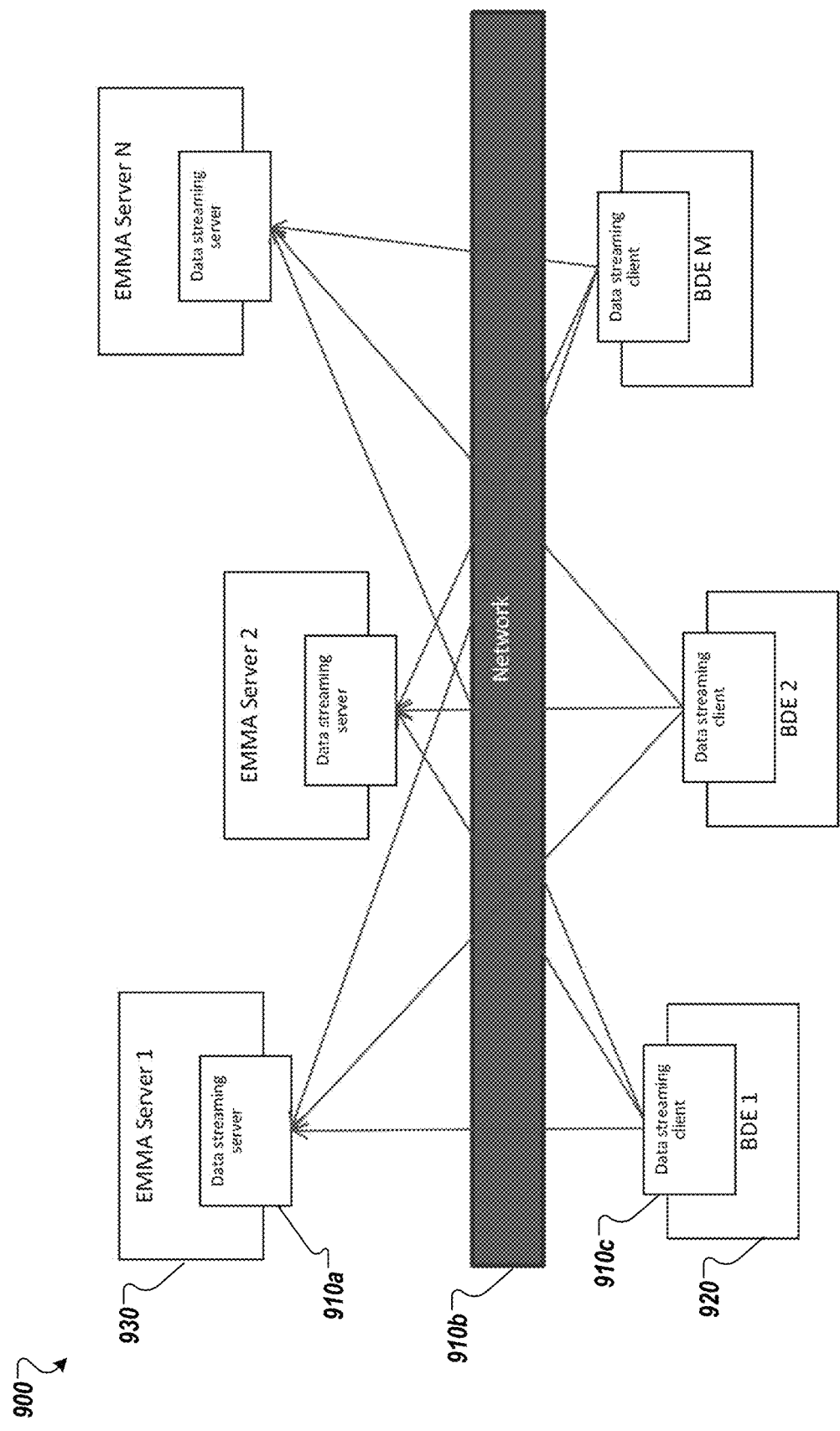
FIG. 13 is a block diagram illustrating an example data streaming architecture.

FIG. 13 is a block diagram illustrating an example data streaming architecture 900. The data streaming layer 910 works as the connector of BDE (Big Data Engine) 920 and in-memory servers 930. It maintains the interface of a Table and its serialization/deserialization over network 910b on different machines and in different languages, and all those intermediate steps between them. In some implementations, the upper layer can just work with Table objects.

There are M data source nodes and N server nodes. After map-reduce, each BDE server 920 generates a table. Then it splits the big table into N tables according to certain partition strategy, and sends each table to its corresponding server. Therefore, each server will receive a table from each BDE server, and assemble them into a larger table that may be in a particular or proprietary format for the upper layer to use. In some implementations, each table sent from each BDE server may be very large. In these implementations, the data streaming component may split it into small sub tables and sent to the destination.

In some implementations, the servers know that each BDE server has finished table transmitting. In these implementations, there is an agreement that each BDE server has to send an empty table to each server to notify it that table data sent to a user is already done. The server can collect M empty tables from M BDE servers, then it knows the data is all transmitted.

Figure 14:
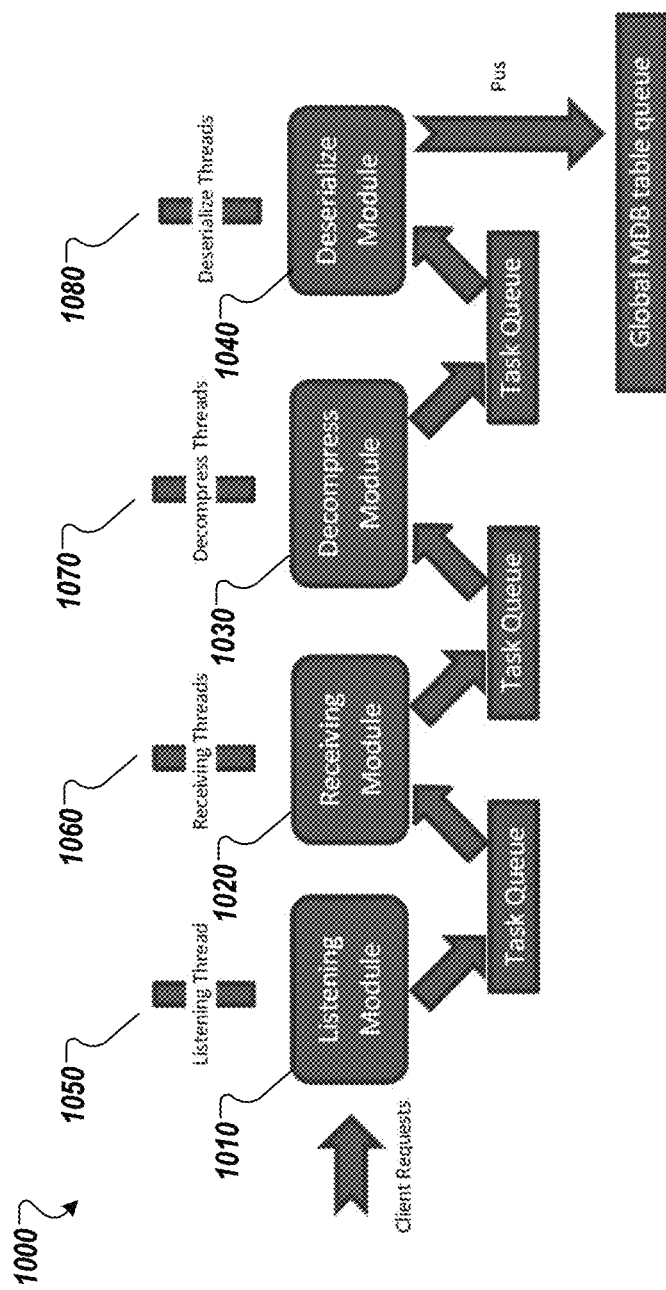
FIG. 14 is a block diagram illustrating an example process for data streaming.

FIG. 14 is a block diagram illustrating an example process 1000 for data streaming. For an online service server, there are usually two basic programming models to choose, one is a multi-threading model while the other is an event based model. The multi-threading model may be more natural for programmers, and may make a programmer focus more on the business logic itself, but may not perform well under high concurrency due to expensive context switch, lock contention, etc. Also, when there is a large amount of requests at the same time, a c10k problem may arise. The event model may not also have the c10k problem. However, the event model may not be as natural for programmers. For example, event based models tend to obfuscate the control flow of the application. Many event systems "call" a method in another module by sending an event and expect a "return" from that method via a similar event mechanism. In order to understand the application, the programmer should match these call/return pairs, even when the call/return pairs are in different parts of the code.

In some implementations, a system may include a combination of the above two modes. In these implementations, the system decomposes a business into several stages, connected with several queues. Inside each stage, there are several work threads, which take the input from the task queue, and write the result into an output queue that may be an input task queue of another stage.

Figure 10:
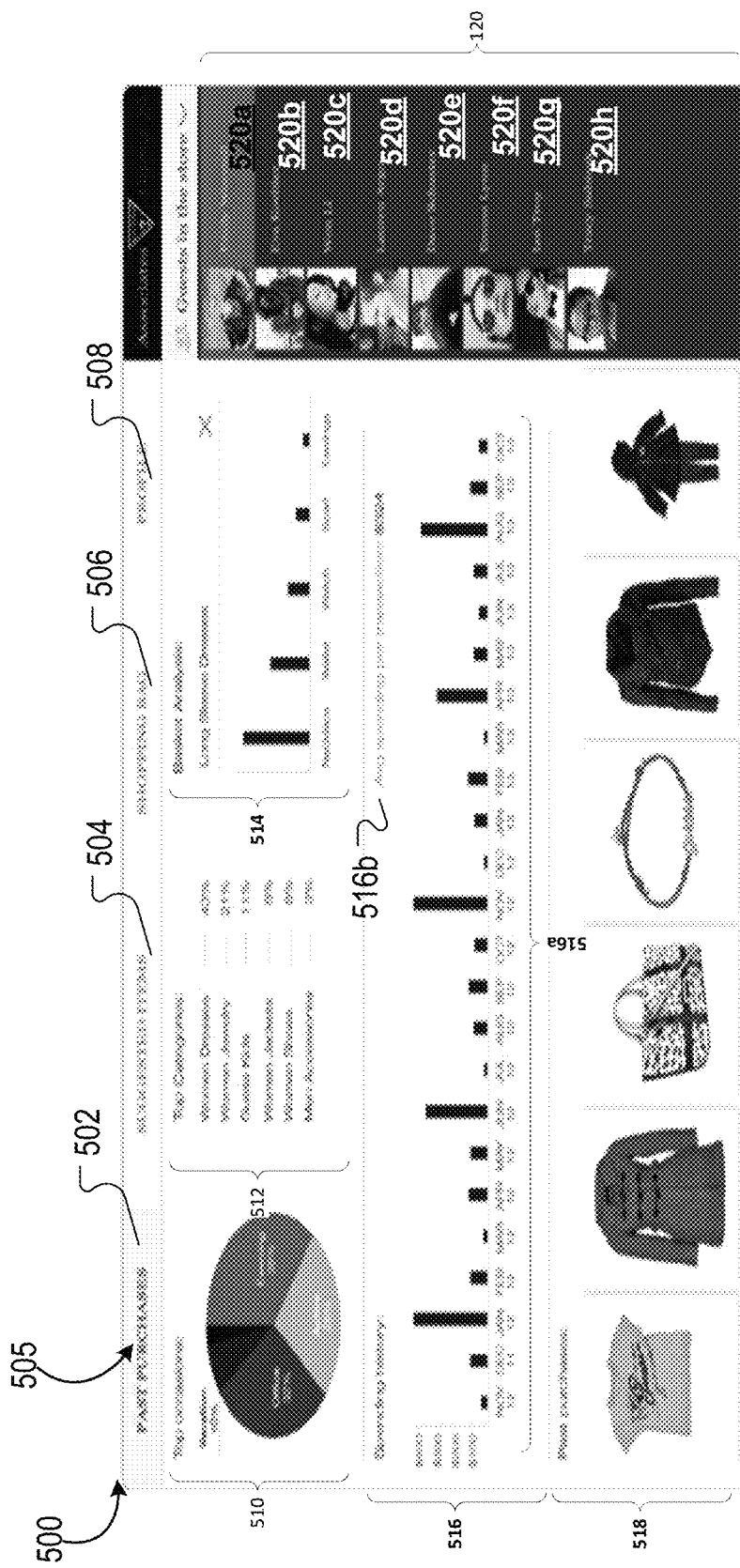

In some implementations, the data streaming server performs a process using four modules, the listening module 1010, the network receiving module 1020, the decompress module 1030, and the deserialize module 1040 as is illustrated in FIG. 10.

The listening module 1010 uses one listening thread that listens on a certain port, accepts client requests, generates internal connections, and pushes into a task queue. The receiving module 1020 uses several receiving threads that are responsible for receiving binary table data from clients and checks whether the data is correct. After the receiving module 1020 receives data, it closes the connection with the client, and pushes raw table data into a task queue.

The decompress module 1030 decompresses raw table data if the raw table data is decompressed. The deserialize module 1040 uses several work threads that help deserialize the binary data into a table that may be in a particular or proprietary format, and push the deserialized data into a global queue, waiting for the upper layer to use the deserialized data.

Decomposing the process into small granular stages allows for flexibility in controlling the system and resources. For example, the thread pool of each module could make adjustments according to the situation of its task queue. In some implementations, work threads poll a task queue to determine if there is a task for the work thread. In some implementations, the system switches to the event model.

There are several types of threads inside the data streaming server. The server includes a listening thread 1050 that on a certain port, accepts connections from clients, and pushes them into task queue. In some implementations, the server includes only one listening thread 1050. The server includes a receiving thread 1060 that receives binary data from a client, and calculates the checksum to make sure the received data is correct. The server includes a decompress thread 1070 that decompresses binary data. The server includes a deserialize thread 1080 that deserializes binary data into tables that are in a particular or proprietary format.

In some implementations, the server includes a monitor thread that runs periodically to determine system CPU and memory usage. In some examples, the server includes a clean thread. The end of table occurs when the server receives an empty sub-table from a data node to indicate that the table from the data node has completed transfer. With the server performing decompression and deserialization in different stages, any previous sub-tables may or may not be already deserialized. Therefore, when the server receives and empty table, the clean thread will put this table on a watch list, and check whether all sub-tables from this data node are already deserialized. If the table is deserialized, then the clean thread pushes it into a global queue for the upper layer to use. If the table is not deserialized, then the clean thread will keep watching until it is deserialized.

In some implementations, the server includes an adaptive thread that checks the task numbers of each queue, and decides whether to start new threads or kill old idle threads. In some examples, the server includes a server loader thread that, when the server shuts down, flushes raw table data, sometimes all raw table data, in memory into disk. Therefore, this thread is responsible for loading the data when the server restarts.

The protocol may be based on TCP channel to improve the correctness of data. There are several interactions between server and clients. At the beginning, when a connection is established, a client waits for an OK command from the server. If there are already too many connections in the server, or system resources are sufficient, then the server sends a BUSY command to the client. When the client receives a BUSY command, the client will retry within a certain time period.

After the client receives an OK command from the server, the client sends a META command to the server. The META command describes some metadata information about a table to be sent, such as table ID, table sequence number, table size, or whether table is compressed or optimized for the network.

After the server receives the META command, the server checks if it can find this table in memory. If the server can find the table, it suggests that the table is somehow not finished transferring data the previous time. The server obtains the confirmed size, and sends an OFFSET command to the client, so the client can resume the last transmission in order to save time. If the server cannot find the table in memory, then the server creates a new table and sends the offset equal to zero.

After the client receives the OFFSET command, the client sends a DATA command together with real table binary data to the server. The server receives the real table binary data, and calculates checksum for this binary. If the checksum matches with the one sent by client, then the server sends an OK command to client. If the checksum does not match, then the server sends an ERROR command with a corresponding error code and requests that the client re-send.

The server utilizes several commands. Each command has a four byte header to indicate its type. Different commands may have different parameters.

The OK command includes a header "OKOK" and no parameters. The BUSY command includes a "BUSY" and no parameters. The META command includes a "META" header and the parameters table name (String), table size (int), table sequence number (int), compressed (bool), and opt4network (bool). The OFFSET command includes the header "OFFS" and the parameters offset (int). The DATA command includes the header "DATA" and the parameters table binary data (binary) and checksum (binary). The ERROR command includes the header "EROR" and the parameters error code (int).

The server includes a configuration file that may be passed as a parameter for the server to initialize its default setting. The format of the configuration file is as follows.

```
{
    "http" :
    {
        "port": 12345
    },
    "thread" :
    {
        "receiverThreadNum": 5,
        "receiverThreadMaxNum": 10,
        "deCompressThreadNum": 3,
        "deCompressThreadMaxNum": 10,
        "deSerializeThreadNum": 5,
        "deSerializeThreadMaxNum": 8,
        "monitorThread": true,
        "adaptiveThread": true,
        "loadPreviousTables": true
    },
    "datasource" : [
        {
            "ID" : "10.197.62.100"
        }
    ]
}
```

The data source section specifies the data source identification. In some implementations, the server uses IP.

The server implements an adaptive thread control. For the control strategy, if any waiting task numbers in the queue are greater than a particular number, for example, one hundred, then the process will spawn another corresponding worker thread up to the max thread number specified in the configuration file. If the waiting task numbers in the queue are less than another particular number, for example, ten, then the process kills any temp idle worker thread.

When the server shuts down, the server saves state. The server loads the state when starting. When the data streaming server shuts down, if there are still some raw tables waiting to be decompressed or deserialized, or some tables waiting to be completed, for example, waiting for a table from another data source node, the server will flush them into disk. By default, the server may save to a BIN/DataStream folder. When the server restarts, the server will spawn a loader thread to load the contents of the folder into memory.

In some implementations, the Global table queue may be used as unstructured or semi-structured data in the process described with respect to FIG. 1. In these implementations, the Global table queue may be integrated with structured data and results to queries may include a combination of structured data and unstructured or semi-structured data. In this regard, the streaming data may be treated in a similar manner to a search index and the streaming data (e.g., data from a social media source) may be accounted for and integrated with structured data in query results.

Figure 15:
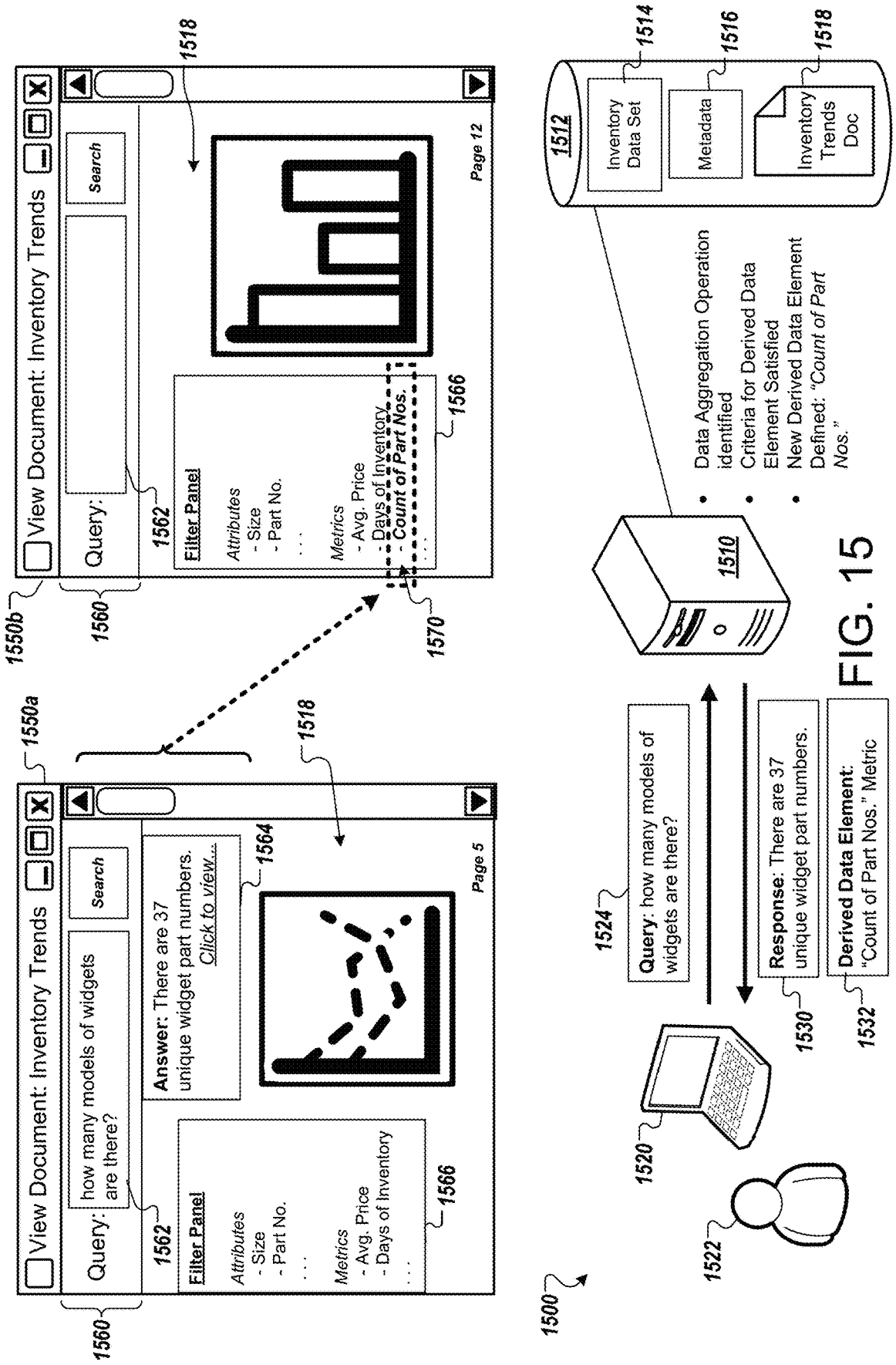
FIG. 15 illustrates an example system that can derive data elements from queries.

FIG. 15 illustrates an example of a system 1500 for deriving data elements from queries. In the example, a computer system 1510, such as a server system, that provides data to support an interface of a client device 1520. For example, the computer system 1510 may provide data for an application, web application, web page, voice interface, or other user interface. The computer system 1510 provides search functionality that allows a user 1522 of the client device 1520 to submit natural language queries and receive answers. In addition to receiving and processing search queries, the computer system 1510 evaluates properties of received queries and determines whether the queries satisfy criteria for deriving new data elements, such as new attributes or metrics for a data set. When the criteria are satisfied, the computer system 1510 can store data defining a new derived data element and cause the new derived data element to be represented in the user interface at the client device 1520. For example, a derived data element created based on a query can be provided as selectable option on a portion of the user interface separate from the functionality for submitting queries and receiving responses. The derived data element can be used for a variety of non-search or non-query purposes, including as an option for inserting the derived data element into a document or visualization, for providing a control for filtering data based on the derived data element, for insertion into an equation or calculation, and so on. This allows information queried about to be made available for reuse in a variety of other interfaces and contexts, in many cases without requiring the user to ever request or indicate that the data should be saved or made available later.

As used herein, a derived data element can be a data element inferred by the computer system to be relevant to a document, data set, user, or other context. The derived data element may be inferred from one or more queries. In some implementations, an element may additionally or alternatively be inferred to be relevant based on other user actions that show interest in an operation applied to data (e.g., manipulating values, manually creating an equation, etc.). In many cases, a derived data element can provide a value or set of data that is generated from a data set but does not exist in the data set. In some cases, a derived data element may represent a portion of a data set that exists in a data set, but the purpose, use, or relevance of the data is inferred from the query. For example, if users frequently ask about a characteristic of a particular record, the value represented by that particular field of the record may be provided as a derived data element, without alteration, simply based on the importance or relevance of the value being inferred.

Derived data elements may represent metrics, attributes, or other types of data. In some implementations, a metric refers to a calculation performed on data. Rather than being a fixed value, the metric can represent a formula or equation applied to data, so that the value of the metric changes as the underlying data changes. Thus a metric can specify an operation to be performed and the source data to be operated on. In some implementations, an attribute represents an entity in a data model, and may be identified by a unique column identifier. The attribute may be an identifier, a descriptor, a fact, or other data.

In the example of FIG. 15, the client device 1520 displays a user interface 1550a which presents a document 1518 called "Inventory Trends." The user interface 1550a provides a search interface 1560 that can be accessed within or along with the view of the document. For example, the search interface 1560 may enable the user 1522 to enter a query to search within the document or to search one or more data sets associated with the document (e.g., data sets linked to the document, data sets relied on by the document, data sets having a same topic as the document, etc.). The search interface 1560 includes a query field 1562 that a user can use to enter text of natural language queries. In some implementations, the search interface 1560 enables a user to speak a query, which can then be converted to text using an automated speech recognizer.

The user 1522 enters a query, "how many model of widgets are there?" The search interface 1560 causes the client device 1520 to provide the query 1524 received from the user 1522 to the computer system 1510, for example, over a network. The client device 1520 may also provide context data to indicate the context in which the query occurred, for example, an identifier for the user 1522, an identifier for the client device 1520, an identifier for the document 1518 being viewed when the query 1524 was entered, a data set 1514 associated with the document 1518, and so on. The computer system 1510 may already have some of this context data, for example, if the computer system 1510 served the document 1518 or otherwise provides data supporting the user interface 1550a.

The computer system 1510 processes the query 1524 and generates results for the query 1524. This can involve any of various steps such as semantic interpretation of the query 1524, generating structured query language from natural language text of the query 1524, retrieving data from databases or other data repositories 1512, selecting a format or type of answer for the query, and formulating a response 1532 to the query 1524. The computer system 1510 then sends the response 1532 to the client device 1520 for presentation. The client device 1520 then presents the response 1532 in a query results area 1564 of the user interface 1550a.

In addition to responding to the query 1524, the computer system 1510 evaluates the query 1524 and related data to determine whether a derived data element should be defined based on the query. The computer system 1510 is configured to evaluate whether a query involves certain types of operations, such as calculations, data aggregations, data retrievals, and others. When an operation of a certain type is detected, and optionally other criteria are also satisfied, then the computer system 1510 can automatically define a new derived data element representing that operation. This new data element can be an element that does not occur in the actual data set itself, such as the result of applying calculation or processing to at least a portion of the data set. Similarly, the derived data element can be a new data object that is not defined in the schema or structure of the data set.

In the example of FIG. 15, the computer system 1510 is configured to define derived data elements for data aggregations involved in queries. The computer system 1510 detects that the query 1524 calls for a data aggregation, for example, based on recognizing the phrase "how many" as an indication that a count over a variety of entries is requested. In addition or as an alternative, the computer system 1510 may evaluate the steps used to generate the response 1530 for the query and determine that a "count" operation was used to generate the value "37" for answering the query 1524. As another example, the process of generating the result may include generating a structured query in structured query language (SQL) or an application programming interface (API) call to a server, a database system, or other system. The computer system 1510 may analyze the SQL query or API call to determine whether one of a predetermined set of operations is requested.

After determining that the query 1524 involves an operation of an appropriate type, the computer system 1510 may check other conditions to determine whether a derived data element should be defined. For example, one of the conditions for defining a derived data element may be that the operation be used at least a threshold number of times or with at least a minimum level of frequency before it is saved and presented for reuse. The computer system 1510 can check user activity data, such as query logs, to determine a number of times the current user 1522 and potentially other users have initiated operations involving the current operation, and determine if the usage meets applicable thresholds. Other criteria may assess the structure or nature of the data set, for example, so that operations that involve some portions of the data set (e.g., certain columns or tables) may be used for derived data elements and operations that involve other portions (e.g., temporary or rarely used portions) not being used to derive new data elements. Similarly, the operation may be compared to other data elements, whether explicitly defined or derived based on user actions. For example, if the operation results in a metric that is the same as or very similar to an existing metric, the operation may not be meet criteria for avoiding duplicate data elements.

When the operation corresponding to the query satisfies the appropriate criteria, the computer system 1510 stores data that define the operation as a new derived data element. For example, the system defines a new derived metric of "Count of Part Nos." to represent the operation that was used to answer the query 1524. The data indicating the derived data element can indicate the parameters needed to perform the operation again at a later time, e.g., the operation to be performed (e.g., determine a count of unique widget part numbers), an identifier for the data set 1514 (e.g., for the "Inventory Data Set" referenced by the "Inventory Trends" document 1518), a portion of the data set 1514 (e.g., a "Widget" table identified based on the query terms), etc. Rather than simply storing the value that was provided in the response 1530, the derived data element can provide sufficient information for the computer system 1510 or another computer system to dynamically re-compute the result in the future with whatever data is current in the corresponding data set 1514 at that time.

A derived data element for a query may be the result or answer requested by the query. For example, in FIG. 15, the derived data element "Count of Part Nos." will provide the value requested by the query 1524. The derived data element will not necessarily provide the same result or operation that answers the query, however. For example, the query "Is the average value of column 2 more than 100?" requests a yes/no answer, but a derived data element may instead be defined for the average value, which is defined in only a portion of the query. Derived data elements can have different forms and can evaluate to provide different data types. Some derived data elements may produce a single value, while others may produce a column of values.

The computer system 1510 can store data defining the new derived data element in a variety of ways. For example, the definition can be added to metadata 1516 for the document 1518 and/or the data set 1514. For example, the derived data element definition can be added to data that defines a data schema for the data set 1514. As another example, the derived data element definition can be a record added to a cache or other data associated with the data set 1514. As another example, the derived data element definition can be added to the document 1514. As another example, the derived data element definition can be added to a separate list of data set for the purpose of retaining derived data element definitions.

Once the data defining the new derived data element has been stored, the computer system 1510 uses the information to provide the derived data element on a user interface. In the example of FIG. 15, the computer system 1510 provides data 1532 that causes a new interactive user interface element 1570 representing the derived data element to be presented in the user interface 1550b of the client device 1520. The element 1570 is shown in a display area 1566 that shows various interactive elements representing other data elements of the data set 1514 and/or data element used in the document 1518. In the example, the display area 1566 represents a filter panel, allowing the user 1522 to select different attributes and metrics from the data set 1518 to use to filter the data viewed or visualized in the document 1518. The element 1570 provides a selectable option for a user to select the "Count of Part Nos." derived data element from a list of other metrics, most or all of which may represent actual values or columns of data in the data set or explicitly defined operations.

The user interface 1550b shows a view of the same document 1518 at a later time than the user interface 1550b, where the user has scrolled to view a different portion of the document 1518. The display area 1566 listing data elements in the interface 1550a was shown prior to the query 1524 and does not show the element 1570 representing the derived data element. After the query is processed and the data 1532 is sent to the client device 1520, the element 1570 has been added. Derived data elements may be defined and presented soon after the corresponding query is issued. For example, the user interface 1550b may represent a view substantially immediately after or just seconds after the query 1524 is processed, for example, during the same session in which the user entered the query 1524.

The derived data element can be saved and provided for reuse by the user 1522 or other users over an extended period. For example, the user interface 1550b may represent a view that occurs minutes, hours, days, weeks, months, or years later. For example, after submitting the query 1524, the user 1522 may close the document, log off, disconnect from a network, shut down the client device 1520 or otherwise to end a session of viewing the document 1518 or using the client device 1520. When the user 1520 again opens the document 1518 and views it in a new session, the derived data element 1570 can be provided for use.

When the computer system 1520 provides data for a user interface, the computer system 1510 can determine whether any derived data elements are associated with the current context in which the user interface is presented. Derived data elements can be associated with different types of context, such as specific users, documents, and/or data sets. For example, based on the query 1524, the computer system 1510 may cause a data element derived from the query 1524 to be provided only for the specific user 1522 and the specific document 1518 that were associated with the query 1524. Alternatively, the derived data element may be provided to the user 1522 more generally when any of a set of multiple documents is accessed, whenever a particular data set 1514 corresponding to the document 1518 is used, or when any data set that is related to or similar to the particular data set 1514 is involved. Similarly, access to the derived data element may not be limited to the user 1522 that entered the query from which the data element is derived. Derived data elements can be provided for groups of users or all users when an appropriate context is detected, e.g., when a relevant document 1518 or data set 1514 is involved. To manage the scope of applicability of a derived element, the derived data element definition may indicate Many types of data elements can be derived from queries. Some derived data elements represent calculations performed on data. Rather than being a fixed value, the derived data element can represent a formula or equation applied to a certain set of data, so that the value of the derived data element changes as the underlying data changes. A derived data element may represent a calculation performed on a single piece of data or multiple pieces of data. Some derived data elements may represent aggregations of data, e.g., operations that involve multiple values, multiple portions of a data set (e.g., multiple records, multiple columns of data, multiple tables, etc.), or even data from multiple data sets. A derived data element may represent a single operation to be performed on data from a data set or a combination of multiple operations. Similarly, a derived data element may represent a result of a query, only a portion of a query, or an intermediate part of processing a query. In some cases, multiple different data elements can be derived from a single query.

Many derived data elements represent values or data that does not exist in (e.g., is not stored in or part of) the under data set, and thus must be generated or derived from the data set through some calculation or other processing. Nevertheless, in some implementations, a derived data element may represent a value or values that do exist in the data set, but which have a new use or purpose inferred on the basis of user queries or other interactions. In other words, the calculation or operation represented by a derived data element may simply be to retrieve and provide a particular value or data range. This can include selecting subsets of data, such as presenting a set of data after filtering the set with filter criteria as specified by the derived data element. As another example, users in a certain context may submit queries requesting a value from a specific field in a data set at least a threshold frequency or number of times. As a result, the value from that field can be inferred to be relevant to the context on the basis of user activity, and the value can be inferred to be and displayed as being a metric for the data set, even though the field was never manually defined as a metric for the data set.

Figure 16A:
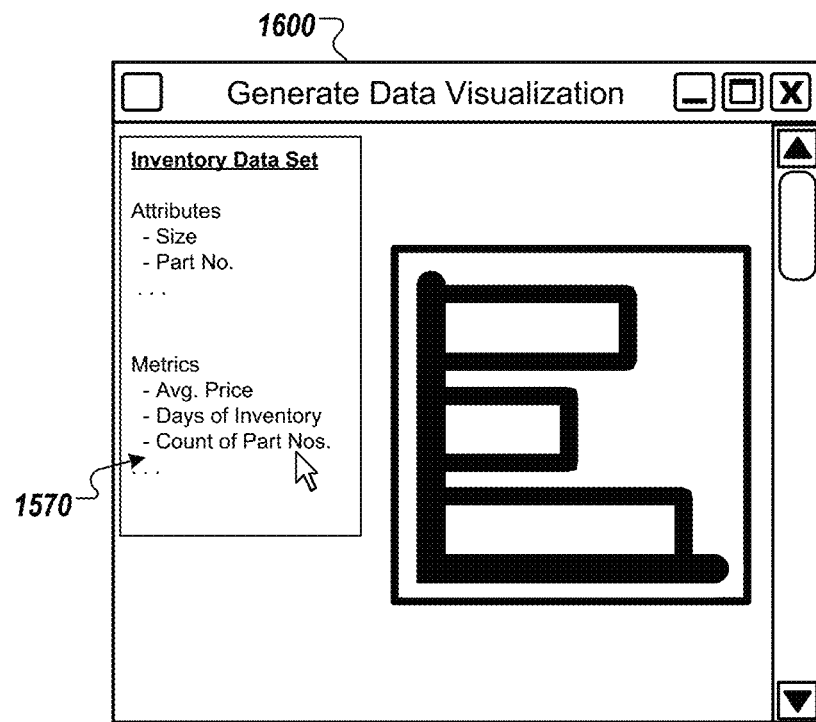
FIGS. 16A and 16B show examples of user interfaces where representations of derived data elements may be presented.
Figure 16B:
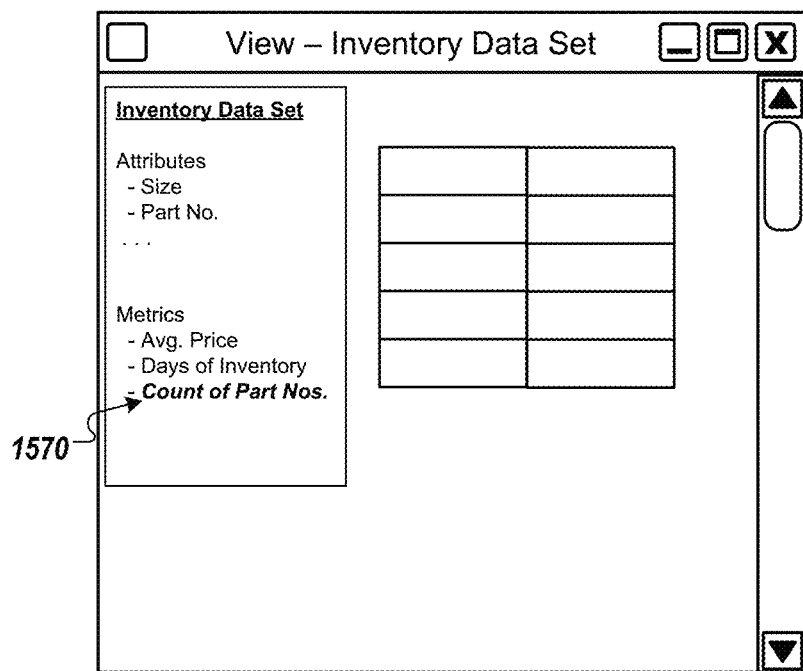

FIGS. 16A and 16B show examples of user interfaces where representations of derived data elements may be presented. In general, the derived data elements can be used in the same manner as other data elements that occur in a data set or are defined in a data schema. For example, interfaces to select, insert, view, or otherwise use data elements such as metrics and attributes can also provide representations of derived data elements.

FIG. 16A shows a user interface 1600 for generating a visualization, where the inventory data set 1514 from FIG. 15 has been selected. When showing elements of the data set 1514, an element 1570 representing the derived data element can be displayed. Selection of a derived data element may be used to, for example, add the data represented by the element to a chart, graph, or other visualization, insert the corresponding data into a label or description, specify the derived data element as a reference value, or otherwise use the data element. In a similar manner, derived data elements may be indicated to a user, for example, with a selectable control for insertion or use of the corresponding data, in interfaces for generating documents, dashboards, information cards, messages, and other content.

FIG. 16B shows a user interface 1610 for viewing or manipulating a data set. Although the derived data element from FIG. 15 is not part of the data set 1514, a user interface element 1570 for derived data elements for the data set 1514 can be shown. In some implementations, derived data elements may be presented as values or columns of data. For example, a derived data element may be provided or used as a virtual column of data in the data set. Though not actually stored as literal values, the current results of the operation corresponding to the derived data element can be shown and used as if the data were part of the data set 1514.

Figure 17A:
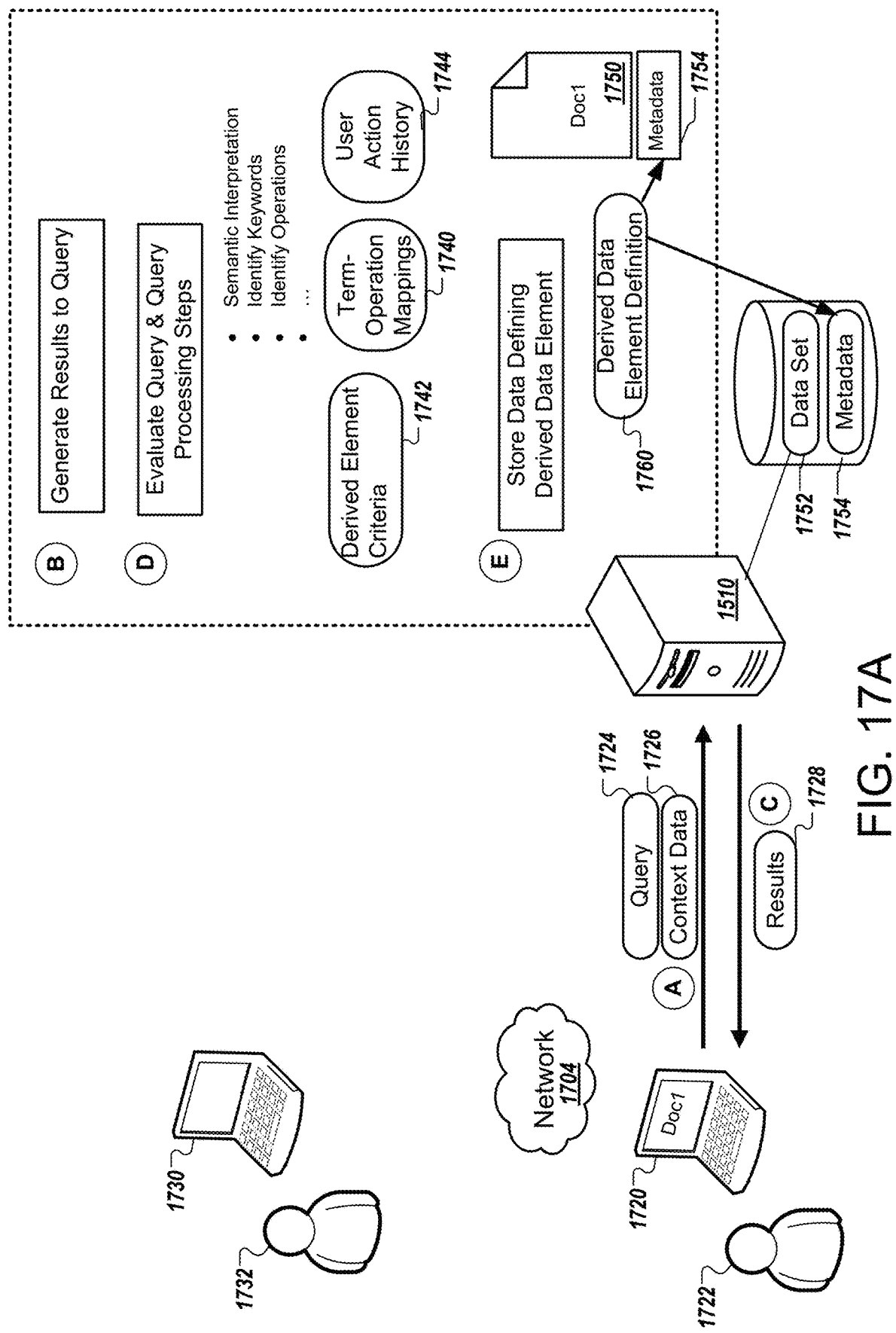
FIGS. 17A and 17B illustrate an example of a system for deriving data elements from queries.
Figure 17B:
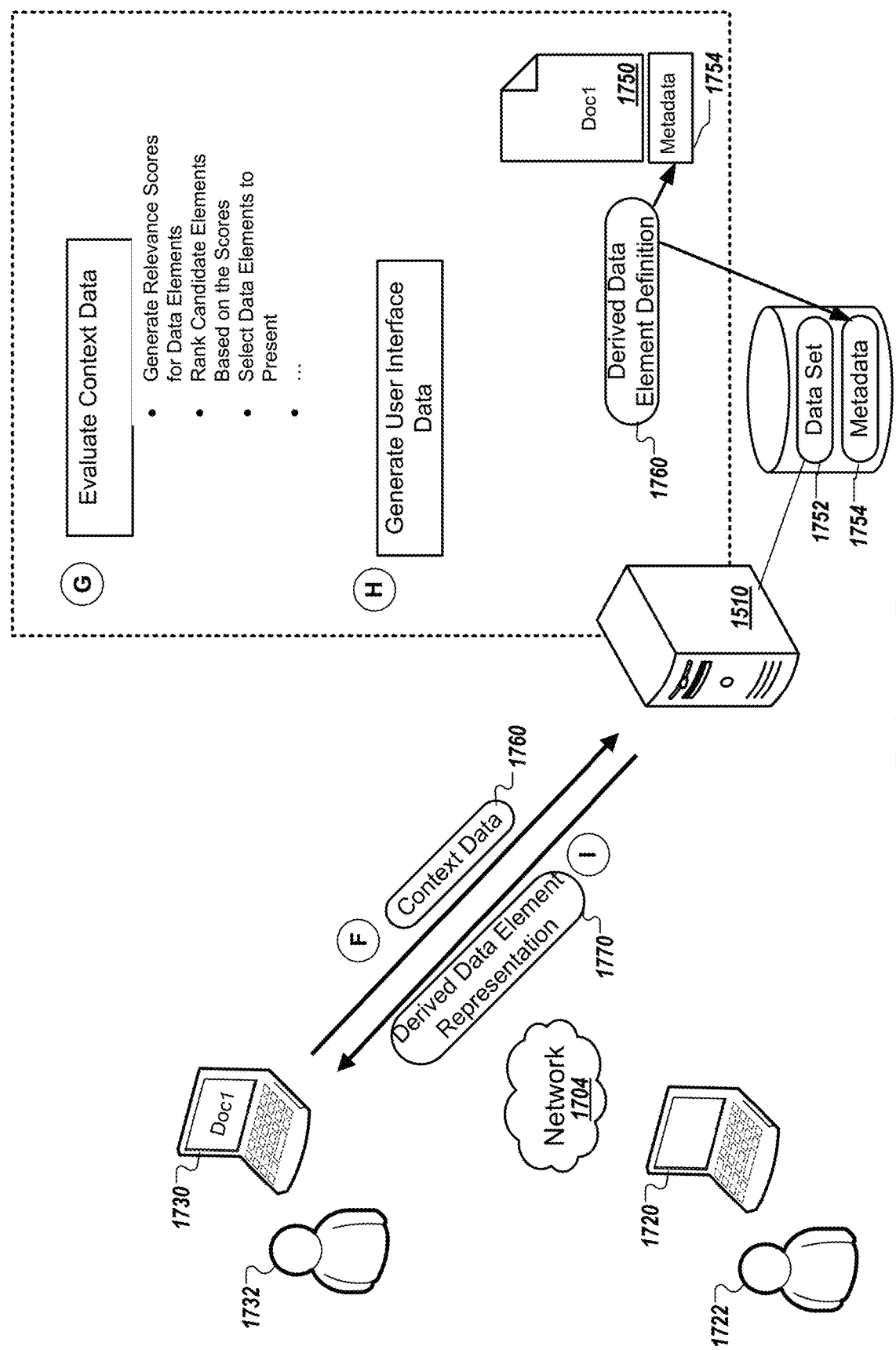

FIGS. 17A and 17B illustrate an example of a system for deriving data elements from queries. The example provides additional detail of how the computer system 1510 can operate to process queries, derive data elements, and use the derived data elements. FIG. 17A shows a query 1724 being received and processed, and data for a new derived data element being stored. FIG. 17B shows the new derived data element being provided when an appropriate context is detected. The figures show a flow of data over the course of a series of stages labeled (A) to (I) which can be performed in the order illustrated or in another order.

In FIG. 17A, at stage (A), a client device 1720 provides a query 1724 from a user 1722 to the computer system 1510 over a communication network 1704. The client device 1720 has a document "Doc1" open, e.g., with an interface for viewing, editing, sharing, or otherwise using the document. The client device 1720 provides context data 1726 that indicates a context in which the query 1724 was entered. The context data 1726 may indicate, for example, the document open, an identifier for the user 1722, an identifier for the client device 1720, an indication of a data set associated with the document, and so on.

In stage (B), the computer system 1510 determines a response to the query 1724. This can include interpreting the query, retrieving data from one or more data repositories, formatting a response, and so on.

In stage (C), the computer system 1510 sends the results 1728 to the query 1724 to the client device 1720 for presentation.

In stage (D), the computer system 1510 evaluates the query 1724 and related information to determine whether any new derived data elements should be defined as a result of the query. This process can include semantic interpretation of the query 1724, including a determination of which elements represent operations to perform on data, which elements refer to portions of data sets, and so on. The computer system 1510 may identify specific terms, e.g., keywords or key phrases, that are known to represent operations that can be represented as derived data elements. Stored term-to-operation mapping data 1740 can indicate predetermined relationships between terms and corresponding operations, and can be used to identify operations from natural language text of the query 1724.

The computer system 1724 may detect a variety of types of operations to be used for deriving data elements. The operations from which new data elements are derived can include data aggregation operations. As an example, queries that involve any of a predetermined set of operations can be detected as candidates for deriving a new data element, e.g., operations such as determining a maximum, a minimum, a count, a mean, a median, a mode, an average, a sum, a range, a standard deviation, a variance, or a summary. The computer system 1510 can detect when these operations are called for by a query, even when the query does not state those particular operations directly. The computer system 1510 can evaluate the terms, phrases, and overall structure of a query to identify terms that signal a data aggregation. To facilitate this, the system can store data that maps terms to operations. As an example, the terms "total," "number of," and "how many" can be associated with count or sum operations.

In many cases, only a portion of a query refers to an operation, such as a data aggregation. Users can various keywords and phrases to specify and create data aggregation derived metrics based on an existing attribute or metric. The attributes or metrics for a data set can be specified in the data set itself, in metadata with labels or names, or in another manner. A few examples of query patterns and corresponding operations are shown below. Each has a query word or phrase followed by an element representing a data element (e.g., an attribute name or metric name) then after the "->" symbol the type of function that results:

Average+[attribute]/[metric]->avg (attribute/metric)
Maximum+[attribute]/[metric]->max (attribute/metric)
Max+[attribute]/[metric]->max (attribute/metric)
Minimum+[attribute]/[metric]->min (attribute/metric)
Min+[attribute]/[metric]->min (attribute/metric)
Sum+[attribute]/[metric]->sum (attribute/metric)
Sum of [attribute]/[metric]->sum (attribute/metric)
Count+[attribute]/[metric]->count (attribute/metric)
Count of +[attribute]/[metric]->count (attribute/metric)

Operations that lead to new derived data elements, such as data aggregations, may also be identified when queries match predetermined grammars or exhibit certain patterns known to represent aggregations. For example, the computer system 1510 can semantically interpret a query to identify references to data, such as columns, fields, attributes, metrics, etc. of a data set. The computer system 1510 can then determine whether any of various operations (e.g., add, subtract, multiply, divide, concatenate, etc.) are performed on the data. Other techniques can be used to identify or verify that a query involves a data aggregation, such as (i) evaluating a structured form of the query to identify aggregation operations, (ii) evaluating processing steps used to generate results of a query to identify aggregation being performed, and/or (iii) evaluating the results provided for the query.

When an operation of an appropriate type is identified, the computer system 1510 can evaluate any additional criteria need to be met in order to define a new derived data element. In some cases, no further criteria than an operation of the specified type is required. In other cases, criteria may provide further requirements. For example, criteria may require that the operation be used at least a minimum amount by users before defining the new derived data element. The computer system 1510 may access a user action history 1744 to determine whether this condition is satisfied. As another example, the data elements that are referenced by the operation may be required to be present and available before a new derived element is defined. If the needed data is not available, for example, if data references in the query are undefined or if the query cannot be answered appropriately, no new data element may be derived based on the query.

In stage (E), once the criteria for defining a derived data element are determined to be satisfied, the computer system 1510 stores data defining a new derived data element. The new derived data element can be associated with the document 1750 open when the query 1724 was submitted and/or the data set 1752 associated with the document 1750. The data 1760 defining the new derived data element can include an indication of the data set 1752, portions of the data set 1752 to be operated on, the operation(s) to be performed, a label for the data element, a context in which the data element is relevant, and so on. This data may be stored in metadata 1754 for the document 1750 and/or the data set 1752. With the data 1760 stored, the computer system 1510 or other computer systems can provide the derived data element or user interface elements representing the derived data element when an appropriate context occurs.

In FIG. 17B, in stage (F), a client device 1730 sends context data 1760 indicating a current context of the client device 1730. This context data 1760 may indicate an open document, an application, a data set being used, a user 1732, or other information. In the example, the client device 1530 has the same document 1750 open that the client device 1720 had open in FIG. 17A. The context data 1760 may be sent in connection with a request from the client device 1530 for other information from the computer system 1510, such as a request to serve a document, generate a report, obtain data for presentation in a user interface, process a query, etc.

In stage (G), the computer system 1510 evaluates the context data 1760 to determine which data elements should be presented at the client device 1730. The computer system 1510 determines that the context data 1760 indicates that the document 1750 and/or data set 1754 are being used by the client device 1730. Given this context, the computer system 1510 accesses the metadata 1754 relevant to this context, which may be stored for the document 1750 and/or the data set 1752 associated with the document 1750. The computer system 1510 may access various sources of metadata having derived data element definitions for various different aspects of context. The computer system 1510 may then select the derived data element saved based on the query 1724 of FIG. 17A as relevant to the context of the client device 1730.

In some implementations, the computer system 1510 performs additional or alternative steps to find derived elements that match the context of a device. For example, the computer system 1510 can generate relevance scores for data elements, rank the candidate elements based on the scores, and then select data elements to present. This process may use varying values of relevance scores to account for varying levels of match between the contexts associated with derived data elements and the contexts indicated by devices. Similarly, the number and type of data elements selected for presentation can be tailored for the context in which the data elements will be used.

In stage (H), the computer system 1510 generates user interface data to be provided to the client device 1730. The user interface data can include a representation of derived data elements. For example, given the matching document and data set context, a representation of the derived data element from FIG. 17A may be generated. In some implementations, the representation is an interactive control or list element that can be selected to insert, add, view, or otherwise use the derived data element.

In stage (I), the representation 1770 of the derived data element is provided to the client device 1730, where it is presented to the user 1732. As shown in this example, the user 1732 and the client device 1730 can be different from the user 1722 and device 1720 that provided the query 1724 that caused the derived data element to be saved.

FIG. 17C is a table 1780 that shows examples of queries with data about derived data elements that are defined based on the queries. The table 1780 has a number of columns 1781-1785 that show examples of types of information that may be determined and/or stored in the process of processing queries and deriving data elements. There are also rows 1790*a*-1790*h* that each represent a different example of deriving a data element from a query.

A context column 1781 shows aspects of context present when a query is received. These entries can also represent the aspects of context that are saved in association with a derived data element and are matched with future contexts to determine whether a representation of the corresponding derived data element should be displayed. A query column 1782 lists examples of queries that led to the corresponding derived data elements being created. A derived data element column 1783 specify the operations that were extracted from the queries as derived data elements. In other words, the fields in column 1783 indicate the operation that would be performed if the derived data element were evaluated. A label column 1784 shows labels or names that can be displayed on a user interface to indicate the derived data element. These labels can be derived from the query, for example, by taking terms from the query and/or through semantic interpretation of the terms in the query. In some implementations, the labels are derived from the operations selected as derived data elements, or are manually input or edited by a user. A data type column 1785 shows the types of data that would result from evaluating the operations specified in the derived data element column 1783. As shown in the data type column 1785, the results can have different dimension (e.g., single value, column of values, etc.), different formatting or expression (e.g., text, binary, integer, floating point, etc.), and different units (e.g., currency, temperature, time, etc.)

As an example, the first row 1790*a* shows a query "How many records are there?" which was entered while a document "Document1" was open. From the open document, the system inferred that a particular table "Table1" and data set "DataSet1" are involved, because the open document derived at least some of its content from that source. The system derives a data element to represent a count of records in Table1 in DataSet1. When a representation of this derived data element is shown on screen, e.g., in a control to add this value to a visualization or document, the system uses the label "Record Count." The data type obtained by carrying out the operation is an integer. To determine whether to indicate this derived data element on a user interface, the system looks at the context information in the context column 1781. This notes the context of "Document1," so if the user that submitted the query or another user opens the same document "Document1," the system detects that the context has occurred and can show a representation of the derived data element (e.g., a UI control, a list element, etc.).

The other examples in the table 1780 are interpreted in the same way discussed above, showing the query, context, derived data element, label, and data type for other instances of deriving data elements. These show various aspects of the system. For example, row 1790*b* shows that the context can limit applicability to a specific user (e.g., User A), and that the context may be a combination of multiple different types of context (e.g., user, data set, document, etc.) Rows 1790*a*-1790*e* show that multiple different derived data elements can be derived from a single query. Similarly, the derived data element may represent only a portion of a query or an aspect related to the answer to the query that is not directly the answer to the query.

Figure 18:
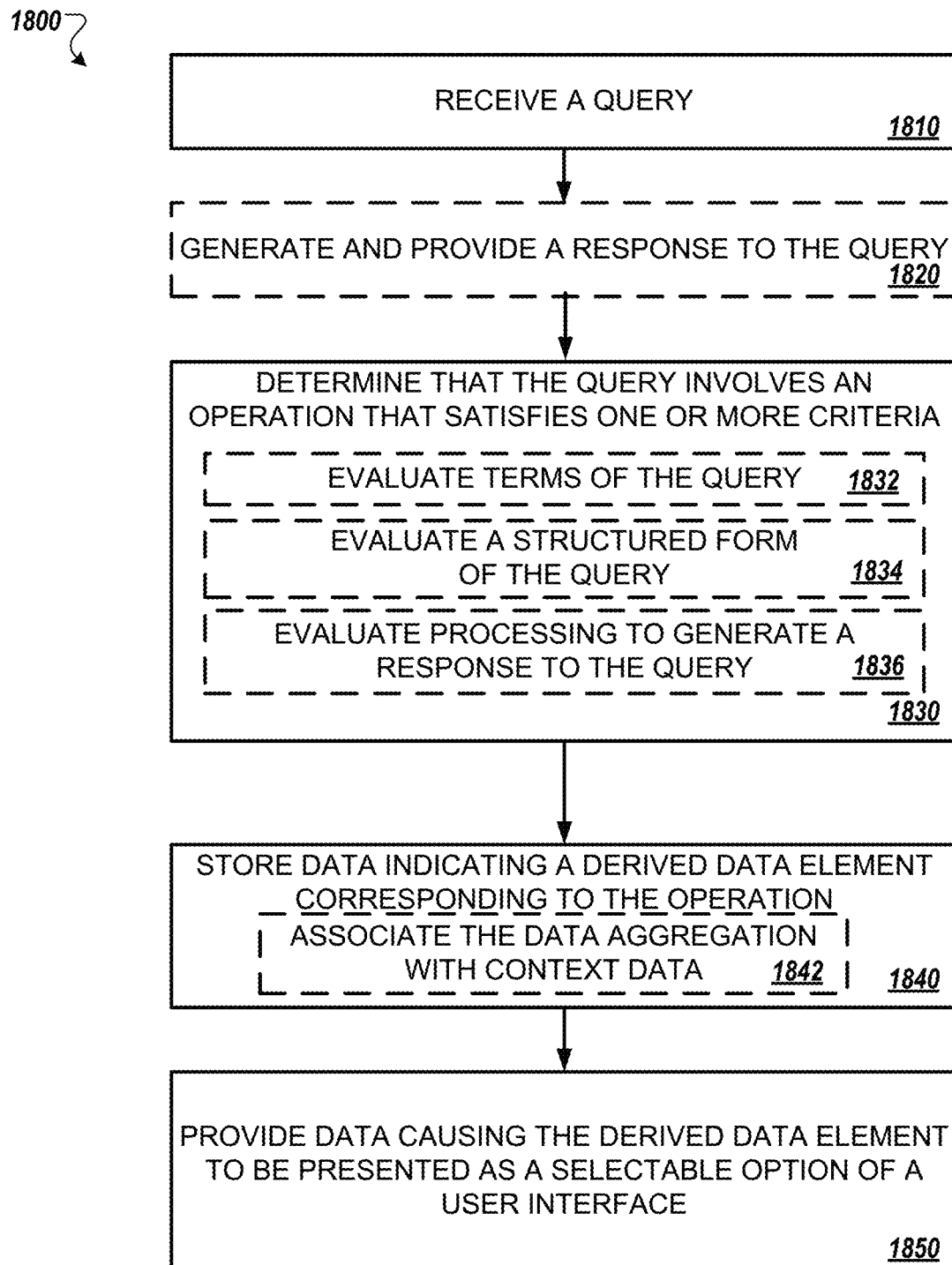
FIG. 18 is a flow diagram that illustrates an example of a process for deriving data elements based on queries.

FIG. 18 is a flow diagram that illustrates an example of a process 1800 for deriving data elements based on queries. The process can be performed by a computer system comprising one or more computers, such as the computer system 1510 discussed above.

The computer system receives a query (1810). For example, the computer system may receive the query from a client device over a communication network. The query may be entered or provided through any of various ways. For example, the query may be a natural language query entered by a user to a user interface, e.g., by entry of text to an application, web application, web page, etc. The query may be natural language voice query spoken by a user, which may be received as audio data or as text derived from audio data after processing with an automated speech recognizer. The query may be a natural language query provide through an application programming interface (API). The query may be a structured query, e.g., according to structured query language (SQL).

In connection with the query, the computer system may determine or receive context data that indicates a context for the query. The context can be information that describes the conditions or situation in which the query was submitted. For example, the context data can identify a specific document, data set, or application being used at the time the query is submitted. In addition, the context data can indicate a specific portion of a document (e.g., a page or section), a specific portion of a data set, or a specific portion of an application (e.g., a view, user interface screen, functionality, etc.). As an example, the context data can indicate a user associated with the query, a user group that the user is included in, a location of a user or device that submitted the query, a time the query was submitted, a date the query was submitted, a topic or keyword associated with a current interface or task, a credential or permission of the user, a document (e.g., open, active, displayed, being edited, etc. when the query was submitted), a data set, a data cube, a visualization, a report, a dashboard, a computing environment, an application, a user interface, or an application function. As discussed below, the context information can be used to identify a scope of applicability for derived data elements, so that derived data elements are used and displayed in contexts determined to be relevant but the derived data elements are omitted for other contexts.

In some implementations, the query is related to a specific document or data set. For example, the query may be submitted to search within a particular document or data set. As a result, the context for the query can indicate the document or data set that is queried.

The computer system optionally provides a response to the query (1820), although in some implementations, a response to the query is generated and provided by another system. The computer system or another system processes the query and obtains search results using a database or other data repository. For example, the computer system can generate relevance scores for the search results, rank the search results based on the relevance scores, and select a highest-ranking portion to provide in the response to the query. Data indicating the highest-ranking portion of results can be provided over a network for display. Depending on the query, the response may include a list of documents, a natural language response such as an answer to a question, a table, a visualization (e.g., a chart, graph, map, etc.), or other data.

The computer system determines that the query involves an operation that satisfies one or more criteria (1830). The criteria may limit the type of operation, the context in which the query is submitted, the identity or characteristics of a data set involved in the operation, or other factors. The computer system can evaluate the query and other information related to the query to determine whether the query is a type that should cause a new derived element to be created. The process can evaluate the types of operations that are requested by or initiated based on the query. For example, the criteria can specify that data aggregation operations can result in new derived data elements. Criteria other than the operation type may be used, such as the type or source of data the operation is applied on, similarity to data elements already defined, whether references in the query are and so on. Criteria may also evaluate other factors such as elements of context indicated by the context data.

In some implementations, the computer system identifies operations that involve a data aggregation as candidates for a derived data element. The computer system can identify operations that involve determining a maximum, a minimum, a count, a mean, a median, a mode, an average, a sum, a range, a standard deviation, a variance, or a summary as data aggregation operations. More generally, the computer system may additionally or alternatively identify references to multiple data items in a query with a requested operation on them (e.g., "field 2 plus field 3," or "value X times value Y"), whether the operation is implicit or explicit, to specify a data aggregation. The presence of a data aggregation may alone be sufficient to cause a derived data element to be generated, but other criteria may be required to be satisfied in other implementations.

To determine if the one or more criteria are satisfied, the computer system can evaluate terms of the query (1832). For example, the computer system can store a set of terms (e.g., keywords, phrases, etc.) and the operations they represent. For example, the terms "sum," "total," "combined," and others, potentially in certain patterns with other terms or semantic elements, may be used to determine that a summation operation is present. Of course, the process of interpreting the query, resolving references in the query, and generating the answer may also be helpful. For example, if a query asks for a "total sales in 2019" that may refer to a specific value existing in a data set (and thus no new data aggregation is needed), or may require a summation operation of multiple records (and thus the system would identify a data aggregation present). The computer system can identify predetermined terms in a query and thus identify that the query calls for specific types of operations.

As another example, the computer system may evaluate a query to identify predetermined grammars or language patterns that are known to correspond to certain operations. The grammars may represent expressions in which certain words and field types or data types occur in certain positions. For example, grammars may include fields, denoted in the following examples with brackets, that represent data references. The grammars "how many [item name] are there in [data range]," "how many [item name] are there over [time range]," and "how many [item name] are there in [data 1] and [data 2]" all show examples where a data aggregation, e.g., count or sum operation, is called for. With patterns such as these, the computer system can isolate portions of a query that correspond to different types of operations and determine when an operation satisfying the one or more criteria occurs.

To determine if the one or more criteria are satisfied, the computer system can evaluate a structured form of the query (1834). In the process of generating an answer to a natural language query, one or more structured queries (such as SQL queries) may be generated to represent the request made in the natural language query. The computer system can assess the features of a structured query (e.g., symbols, patterns, operations, limitations, etc.) to determine whether an operation satisfying the one or more criteria is present. In many cases, a structured query derived from a natural language query may indicate more explicitly an operation that is only implicit in the natural language query, making the operation easier to detect in the structured form. Thus, determining that the query involves a certain type of operation, such as a data aggregation, can include translating the query to a structured query and determining that a symbol or operation indicated in the structured query calls for an aggregation operation.

To determine if the one or more criteria are satisfied, the computer system can evaluate processing done to generate a response to the query (1836). For example, when the response to the query is generated, a log or other record of the steps taken to generate the answer may be created. These records can be evaluated to identify steps known to involve a data aggregation or other operation type that satisfies the one or more criteria. For example, if the processing log for generating a response to a query indicates an action to determine a summation of values in a column of data, the summation operation can be identified as a data aggregation for the query. In some cases, rather than evaluating a log after processing, operations of appropriate types may cause a flag, notification, or event to be created as they are identified and run, and thus indicate the presence of an operation of the relevant type before, during, or soon after the operation is run. Thus, if certain functions are used in the process of generating a response (e.g., sum, maximum, minimum, addition, or other function of multiple data sources) a data aggregation or other operation type can be identified.

The various techniques for detecting different types of operations 1832, 1834, 1836 can be used together to provide increased confidence about the type of operation(s) associated with a query.

Before defining a new derived element, the computer system can compare the candidate derived data element to existing data elements, whether present in the data set, manually defined by a user, or derived based on a query or other user action. If the same or sufficiently similar data element exists, the computer system may determine that no new derived data elements should be created.

In some implementations, machine learning techniques can be used to determine whether an operation that satisfies appropriate criteria is present. For example, a machine learning model such as a neural network, a classifier, a decision tree, a support vector machine, a clustering system, etc. may be trained using examples of queries and labels of whether an operation of a particular type is present. Optionally, the examples may provide feature data indicating characteristics of the context of the query, characteristics of the processing taken to answer the query, and/or characteristics of the response to the query, in addition to characteristics of the query itself. The examples may be labeled, for example, with a type of operation occurring and whether the operation satisfies the appropriate criteria for defining a new data element. Thus, when a new query is received, the trained machine learning model can be used to obtain a prediction of the operation(s) associated with the query and/or a prediction of whether the criteria or conditions for defining a new derived data element are satisfied.

In response to determining that the query involves an operation that satisfies one or more criteria, the computer system stores data indicating a derived data element corresponding to the operation (1840). The derived data element can be is saved, and a corresponding interactive element provided, based on the use of the operation in processing the query. For example, the process of defining the derived data element can occur automatically, without any user input indicating that the derived data element should be saved or that the derived data element should be made available for future use.

The stored data can be used to define the derived data element for a particular document or data set. Thus, the stored data can identify a specific document and be stored in association with that document when the derived data element should be shown in connection with that document. Similarly, the stored data can identify a specific data set and be stored in association with that data set when the derived data element should be shown in connection with that data set. The stored data can also specify context elements that specify when a derived data element is relevant, e.g., for a certain user, user group, document, data set, etc.

The stored data for the derived data element may include, for example, an indication of (i) a data set, (ii) one or more portions of the data set and (iii) an operation to apply to the one or more portions of the data set. The stored data can specify the nature of the operation to the extent that the operation can be evaluated to obtain a result in the future. For example, for a data aggregation operation, the specific type of aggregation (e.g., sum, average, count, etc.) as well as the specific data fields (e.g., which data cubes, data tables, data columns, fields, etc.) to use in the operation. Thus the saved data can indicate the parameters to dynamically generate or perform again the result of the operation that was associated with the query from a source data set.

This shows how the stored data and the operation can involve information inferred or derived from context, and not from the text of the query alone. For example, when a user is working with a particular data set, or searching in a document that has content based on the data set, the query may not specify the name of the data set. Nevertheless, from the context of the open document or data set, the system can disambiguate or infer the data set involved. Further, the data may be more specific, by using the specific data set elements (e.g., specific columns or fields) determined by resolving the natural language to certain data set portions. For example, a query "show me the total sales from 2017 to 2019" may call for a summation of specific columns, and saved data for a derived data element for this total may indicate the tables, columns, or other data elements needed to create the correct total. Alternatively, in some implementations, for broader applicability a derived data element may be kept in the general form as in the query, for broader applicability to other data sets beyond the current data set. In this case, the natural language processing system may interpret or map the terms to data set portions when the derived data element is again used.

The computer system provides data causing the derived data element to be presented as a selectable option of a user interface (1850). For example, the computer system can provide user interface data causing an interactive control representing the derived data element to be presented on a user interface. The data can be sent to the electronic device through which the user submitted the query, so that the same device provides the indication of the derived data element. As another example, the data can be provided to a different electronic device associated with the user that submitted the query. As another example, the data can be provided to an electronic device associated with a user that is different from the user that submitted the query, e.g., so a derived data element defined based on the query or queries of one or more users can be presented to users that did not submit the queries.

In some implementations, the interactive element indicates a descriptive label for the derived data element, and the derived data element is caused to be presented in a list comprising other interactive elements representing elements of the data set. For example, a user interface may include interactive elements representing columns, tables, fields, metrics, attributes, and/or values of the data set, and the derived data element may have a corresponding interactive element in the list. The derived data element can be listed or shown as an element or property of the data set, similar to tables, columns, and values actually stored in the data set, even though the derived data element is not stored or defined in the data set. The interactive element may be selectable to, for example, insert the corresponding value into a document or equation, specify the derived data element as value for a threshold or filter criterion, add the derived data element to a visualization, and so on. In some implementations, the interactive element is selectable to cause the derived data element to be added to a query field for submitting a query.

The derived data element can be used for a non-search and non-query purpose, thus taking the information inferred from the query and making it available for use for a very different area or purpose. The data can cause the interactive element to be provided outside the query interface used to submit the query, and separate from the response to the query. For example, the interactive element can be provided at a different section of the user interface than the query controls and query results, or even at a different user interface, view, application, or device altogether. For example, the derived data element (e.g., representing a label for the derived data element or the actual resulting value itself) can be used to populate options in a filter panel, populate a menu, provide a recommendation, be included on an information card, be inserted into a document, be set as a threshold or condition, be included in a document being edited or created, and so on. The selection of a representation of a derived data element can cause the system to include, insert, incorporate, add, or modify content based on the derived data element. In some implementations, the interactive element, which may represent a label or symbol for the derived data element, is selectable to cause the result of the operation(s) for the derived data element (e.g., the value(s) resulting from performing the operation(s)) to be used in filter criteria, a visualization, a mathematical expression, a spreadsheet, a database field, a document, a message, and/or a user interface.

The computer system can be configured to retain derived data elements beyond the current session in which the user entered the query. For example, the data can be sent after an end of a session in which the query was submitted, causing the interactive element representing the derived data element to be provided in a subsequent session. A new session may occur, for example, after closing an application and reopening the application, logging out a user and logging back in, moving to another view or function of the application, after a predetermined timeout period ends, using the user interface on a subsequent day, etc.

In some implementations, after data defining derived data elements has been stored, the computer system evaluates context information received from electronic devices to determine when to provide an interactive element or other representation of the derived data elements. As noted above, the stored data indicating the derived data element can include context data indicating a context associated with the derived data element. When the computer system detects a context corresponding to the context for a derived data element, the computer system can cause a representation of the derived data element to be provided. For example, the data provided in step 1850 can be provided in response to detecting that a client device is using the same document or data set used when the query was submitted. As another example, the computer system can determine scores indicating how similar the context of a client device is to the context associated with the derived data element. Then, based on the scores, the computer system provides the data causing the interactive control representing the derived data element to be presented on a user interface associated with a context that has at least a minimum level of similarity with the context indicted by stored context data associated with the derived data element.

Figure 19A:
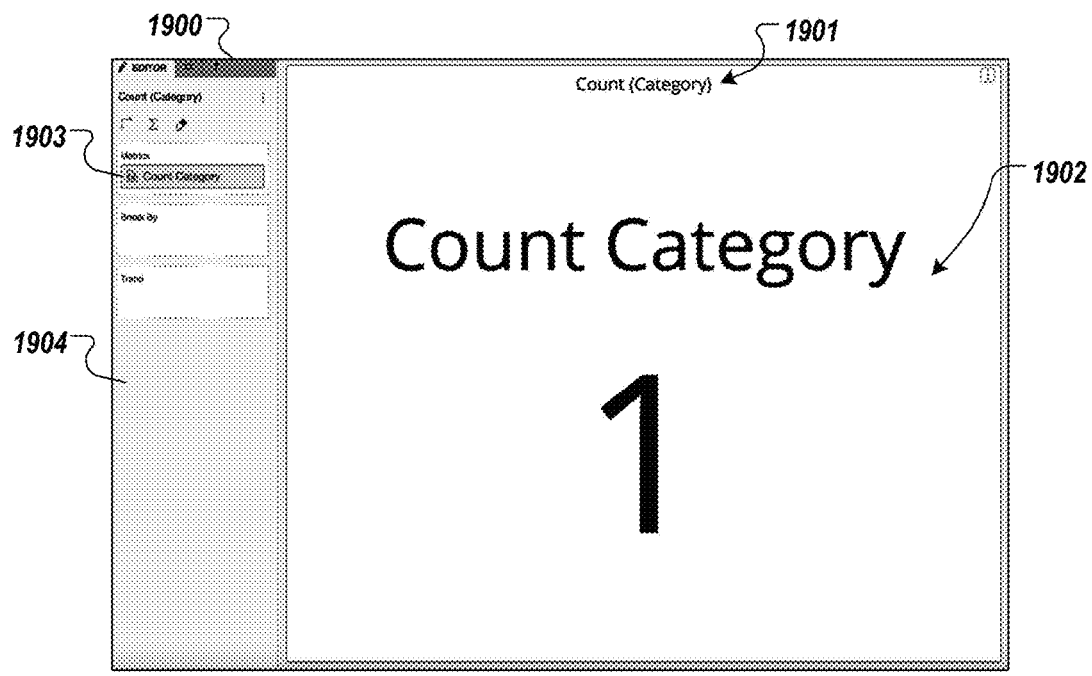
FIGS. 19A and 19B are examples of user interfaces showing an example of deriving data elements based on queries.
Figure 19B:
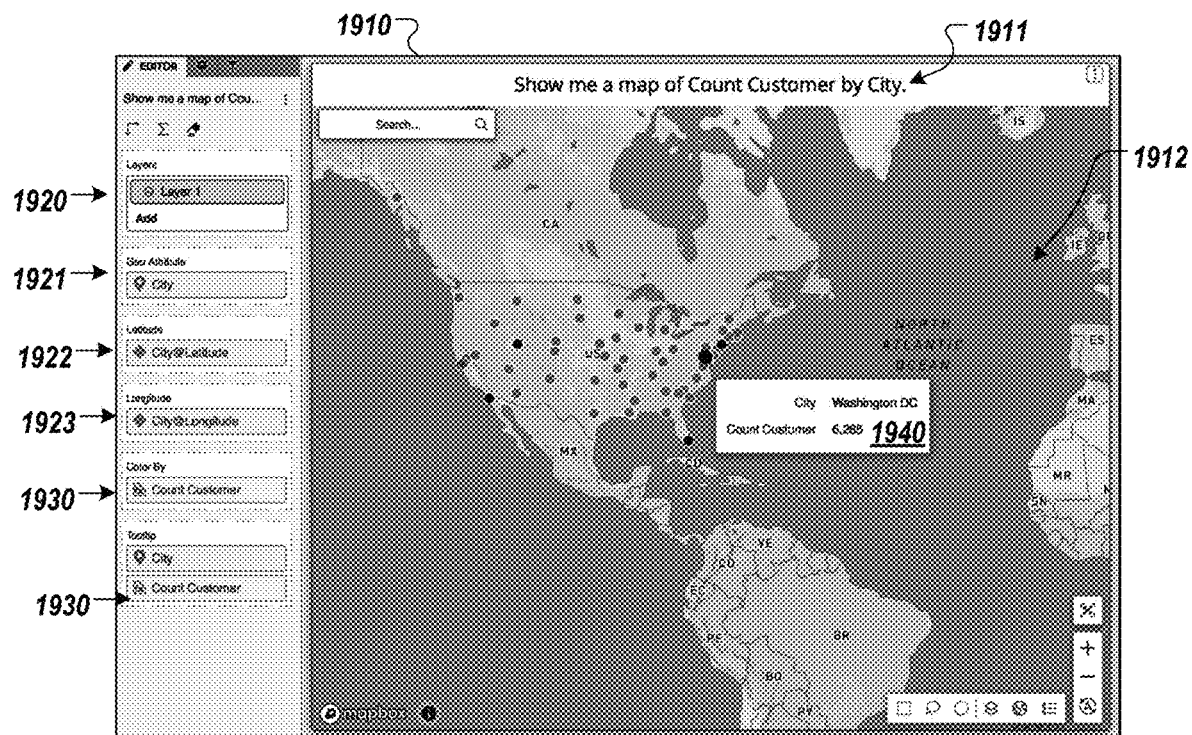

FIGS. 19A and 19B are examples of user interfaces showing an example of deriving data elements based on queries.

FIG. 19A shows a user interface 1900 where a simple query 1901 or expression entered by a user (e.g., "Count (Category)") calls for a count of a number of categories. The result 1902 is shown on the user interface 1900. In response to the query 1901, a derived element 1903 is also automatically shown in the expression editor panel 1904 of the user interface 1900, where it can be used for further expression editing and generation. This can also persist to later sessions of using the application, when the document or data set corresponding to the derived data element 1903 is active in the workspace.

FIG. 19B shows another user interface 1910, in which a user entered the query 1911 "Show me a map of Count Customer by City." The system, interpreting the query 1911, determined that the phrase "count customer" in the query 1911 refers to a data aggregation, e.g., a count of customers in a data set. The system also determines that the count is to be determined by city, and that the results should be presented as a geographical map. As a result, the system generates a map 1912 as the response to the query 1911. The system creates the map 1912 with a new display layer 1920, and with the main geographical attribute 1921 being a city, one of the elements existing in the current data set. The city objects or elements in the data set have a latitude element 1922 and a longitude element 1923 which are identified in the data set and used for placement of indicators on the map 1921.

In processing the query 1911, the system determines that "count customer" or a customer count is not an element of the data set, but is an aggregation of information from the data set. Accordingly, the system defines a new derived metric for this aggregation, labelled "count customer" based on the user's own phrasing in the query. As with other examples discussed herein, the new data element is derived and used by the system automatically, without a user having to initiate the creation of a new data element or specify how the new data element should be defined. In some implementations, the system may provide an option for the user to confirm, edit, or otherwise manage automatically generated derived elements.

A user interface element 1930 for the derived data element is shown in two places: (1) as a "color by" criterion so that the color and size of dots on the map representing cities vary according to the customer count, and (2) as a "tooltip" criterion so that the actual value of a customer count for a city appears in a tooltip comment when a user mouses over, taps on, or otherwise selects one of the dots on the map representing a city. This can be seen in the tooltip element 1940, where the city name attribute and the value of the "count customer" derived element are shown. The elements 1930 are interactive to add or remove the "count customer" derived data element from the field or use where they are currently present, to change the appearance of the map 1912. For example, a user may interact with the lower element 1930 to remove it from the "tooltip" area so that the "count customer" value is no longer present in the tooltip element 1940.

FIG. 20A is a table 2000 showing an example of selecting visualizations based on queries. As part of generating a response to a query, the computer system (e.g., the computer system 1510 or others discussed above) can automatically select a type of data visualization to be provided to the user in response to the query. Examples of visualizations include a grid, a heat map, a tree map, a bar chart, a line chart, a pie chart, a network visualization, a key performance indicator (KPI) view, and a geographical map. In many instances, the user's query does not specify a type of visualization to be generated. The system can nevertheless infer or predict an appropriate type of visualization based on the number of attributes and metrics and the types of attributes and metrics involved in a user's query. A number of rules or predetermined relationships can be used to specify grammars, query patterns, or sets of query characteristics and corresponding visualization types. The table 2000 shows examples 2010a-2010e of some of these rules.

The table 2000 includes a data reference column 2020 indicating fields that each indicate a quantity and type of data elements referenced in a user input, such as a query. In this field, "0-N" refers to any number, including zero, and "1-N" refers to one or more, and so on. Column 2030 shows fields that each have a sample query pattern that would provide the quantity and type of data element references. In these fields, the terms "[metric]" or "[attribute]" are placeholders to refer to any metric or attribute, while terms in quotations (e.g., "time attribute" or "geo attribute") are place holders to refer to a specific type of data element, e.g., an individual data element. A sample question column 2040 shows an example query that meets the criteria of the other fields in the row. A visualization type column 2050 states the types of visualizations that are selected for the respective rows, and which will be used for a query for which the data reference criterion from column 2020 and/or the sample query pattern from column 2030 is found to match a query. The visualization column 2060 shows examples of the types of visualizations indicated in the column 2050, which would be provided in response to the sample question in the same row.

As an example of how the system would use the rules and relationships indicated in the table 2000, if the system determines that a query refers to a single metric, then the system would generate and provide a KPI view, as shown in example 2010a. If a query is determined to refer to one metric and one time-related metric, regardless of the number of attributes, the system determines that a line graph should be shown, as in example 2010b. The time-related metric is used as the horizontal axis of the line graph, and the metric is used as the data series shown in the graph in this example. If a query is determined to refer to one metric and one geographic attribute, regardless of the number of other attributes, the system determines that a map should be shown, as in example 2010c. If the system determines that the query refers to two metrics and one attribute, the system shows a scatter plot, as in example 2010d. If the system determines that a query refers to (i) at least one attribute or (ii) at least two metrics with no attributes, the system can provide a bar graph, as in example 2010e. In addition or as an alternative, the system can look for matches between queries and corresponding predetermined query patterns that are mapped to visualization types.

Figures 20B, 20C:
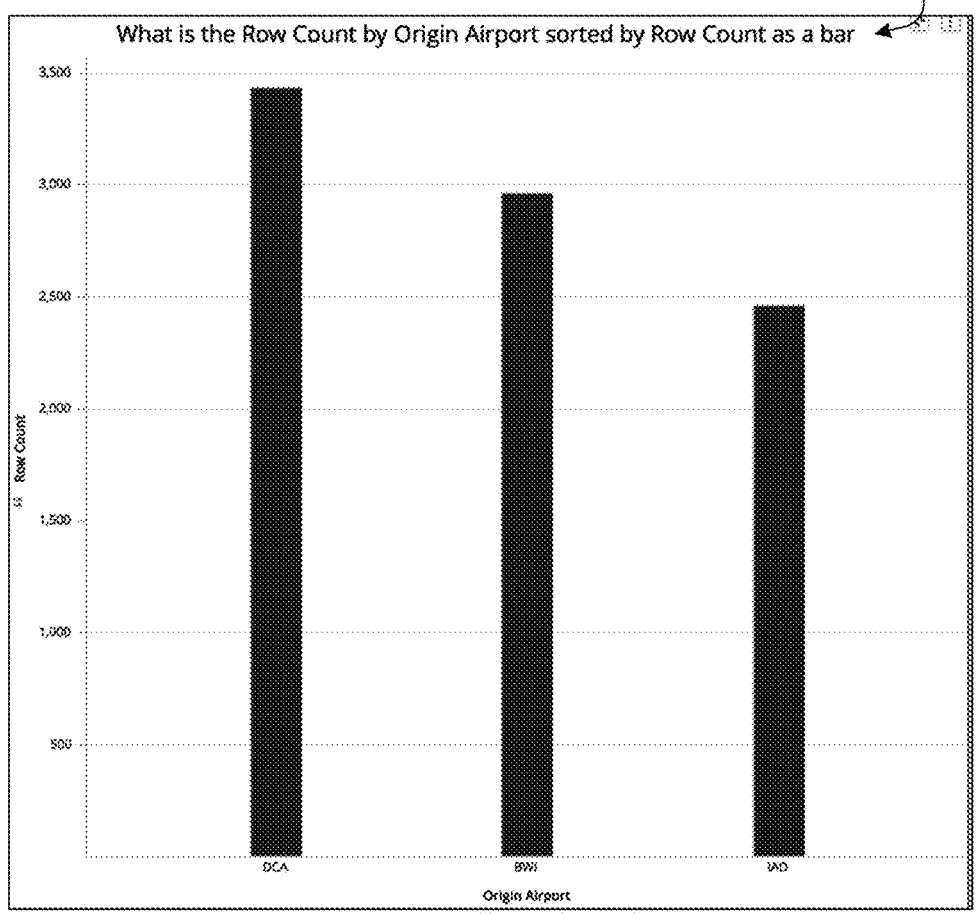
FIGS. 20B-20D show additional examples of visualizations selected based on queries.
Figure 20D:
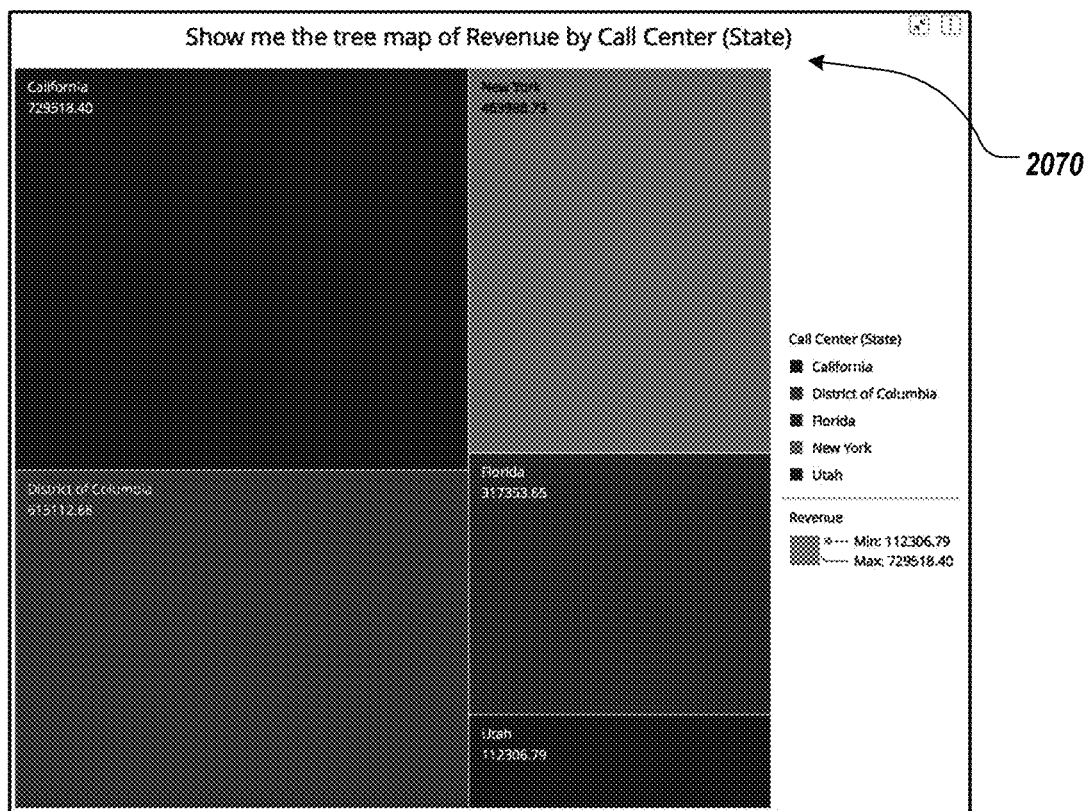

FIGS. 20B-20D show additional examples of visualizations selected based on queries. If the system detects one of a predetermined set of keywords representing a specific type of visualization, the system can generate the corresponding type of visualization. A user may specify a name of a visualization type to request that type of visualization, e.g., use the word "map" to request a geographical map, use "bar chart," "bar graph," or "bar" to request a bar chart, and so on. Other keywords that are not specifically the name of a visualization type may also be mapped to specific types. For example, a phrase such as "geographic distribution" may be interpreted by the system as a request for a map. In FIGS. 20B-20D, each includes a query 2070. The queries 2070 each include a keyword "grid," "bar," and "tree map," respectively, which is identified by the system as corresponding to a specific type of visualization.

The system can adjust the content of a visualization based on the natural language query content also. For example, the system can filter, sort, and rank data to be displayed. For example, when the system receives a query including the "sort by [metric/attribute]," the system can arrange elements in the visualization sorted by the metric or attribute specified. Similar, if the query asks for the "top N [attribute/metric]," such as "what are the top 3 airlines with the highest on-time rating?" the system can look up airline name element of the data set and an on-time metric, and show the three airline names with the highest on-time measures, showing a bar chart of what the on-time measures are. In a similar manner, the system can derive filter criteria from a query. For example, the query "show me months with flights cancelled greater than 1500 as a grid" can be interpreted as a grid of month data and number of flights cancelled per month, with a filter condition of "[Flights Cancelled] Greater than [1500]" is applied. Various phrases can be detected by the system as requesting a filter condition, such as a metric name followed by any of "bigger than," "larger than," "greater than," "smaller than," "less than," "is," or "are," then followed by a number, metric, or expression.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the disclosure.

What is claimed is:

1. A method performed by one or more computers, the method comprising:
   storing, by the one or more computers, data indicating a predetermined set of data processing operations for evaluating queries;
   receiving, by the one or more computers, a query;
   identifying, by the one or more computers, a data processing operation used to generate a response to the query and one or more data objects on which the identified data processing operation is applied to generate the response to the query;
   determining, by the one or more computers, that the data processing operation is included in the predetermined set of data processing operations; and
   in response to determining that the identified data processing operation is included in the predetermined set of data processing operations:
      generating, by the one or more computers, a data element definition for a derived data element based on the identified data processing operation and the identified one or more data objects, wherein the derived data element represents a type of data that results from performing the identified data processing operation on the identified one or more data objects; and
      updating, by the one or more computers, an interface area on a user interface to display an interactive element that represents the derived data element.

2. The method of claim 1, wherein the user interface is a user interface of an electronic device, and wherein the method comprises:
   generating the response to the query using the data processing operation and the one or more data objects; and
   providing the response to the query for presentation in a second interface area of the user interface of the electronic device that is separate from interface area.

3. The method of claim 1, wherein updating the interface area to display the interactive element comprises, after an end of a session in which the query was submitted, updating the interface area on the user interface in a subsequent session to display the interactive element that represents the derived data element.

4. The method of claim 1, wherein the query requests information from a data set; and
   wherein updating the interface area to display the interactive element representing the derived data element comprises causing the interactive element to be presented in a list displayed in the interface area, wherein the list includes other interactive elements representing other types of data of the data set.

5. The method of claim 4, wherein the other interactive elements include interactive elements representing columns, tables, fields, metrics, attributes, and/or values of the data set.

6. The method of claim 1, wherein the interactive element is selectable to cause data aggregation to be used in filter criteria, a visualization, a mathematical expression, a spreadsheet, a database field, a document, a message, and/or a new user interface.

7. The method of claim 1, wherein the interactive element is selectable to cause the derived data element to be added to a query field for submitting a query.

8. The method of claim 1, wherein the data element definition for the derived data element comprises an indication of (i) a data set, (ii) one or more portions of the data set, and (iii) an operation to apply to the one or more portions of the data set.

9. The method of claim 1, wherein the derived data element is saved and provided based on the use of the data processing operation in processing the query, and without any user input indicating that the derived data element should be saved or that the derived data element should be made available for future use.

10. The method of claim 1, wherein generating the data element definition for the derived data element comprises:
    obtaining context information indicating a context of a first computing environment in which the query was submitted; and
    based on the context information, generating a set of criteria for presenting the interactive element that represents the derived data element; and
    wherein updating the interface area to display the interactive element representing the derived data element comprises:
    determining that a context of a second computing environment meets the set of criteria; and
    in response to determining that the context of the second computing environment meets the set of criteria, updating the interface area to display the interactive element.

11. The method of claim 10, wherein the context information includes an indication of a user who submitted the query, a user group that a user who submitted the query belongs to, a geographic location of an electronic device used to submit the query, a time the query was submitted, a date the query was submitted, a topic associated with the first computing environment, a credential of a user who submitted the query, a document open or displayed in the first computing environment, a data set open or displayed in the first computing environment, a data cube open or displayed in the first computing environment when the query was submitted, a visualization in the first computing environment when the query was submitted, a report open or displayed in the first computing environment when the query was submitted, a dashboard of the first computing environment, an application running in the first computing environment when the query was submitted, a user interface of the first computing environment when the query was submitted, or an application function used in the first computing environment when the query was submitted.

12. The method of claim 1, wherein receiving the query comprises:
   receiving a natural language voice query spoken by a user;
   receiving a natural language query entered to a user interface by a user;
   receiving a natural language query through an application programming interface; or
   receiving a structured query.

13. The method of claim 1, wherein the data element definition for the derived data element includes an aggregation operation comprising determining a maximum, a minimum, a count, a mean, a median, a mode, an average, a sum, a range, a standard deviation, a variance, or a summary.

14. The method of claim 1, wherein identifying the data processing operation used to generate the response to the query comprises:
   identifying one or more features of the query that are indicative of an operation; and
   using (i) mapping data that indicates predetermined relationships between query features and corresponding data processing operations and (ii) the one or more features to identify the data processing operation.

15. The method of claim 14, wherein identifying the one or more features of the query that are indicative of an operation comprises identifying, from the query, one or more predetermined terms, symbols, or phrases that are indicative of an operation, and
   wherein using the mapping data and the one or more features to identify the data processing operations comprises using (i) mapping data that indicates predetermined relationships between query terms, symbols, or phrases and corresponding data processing operations and (ii) the one or more predetermined terms, symbols, or phrases to identify the data processing operation.

16. The method of claim 14, wherein identifying the one or more features of the query that are indicative of an operation comprises identifying, from the query, a predetermined grammar or grammatical pattern indicative of an operation, and
   wherein using the mapping data and the one or more features to identify the data processing operations comprises using (i) mapping data that indicates predetermined relationships between grammar or grammatical patterns and corresponding data processing operations and (ii) the predetermined grammar or grammatical pattern to identify the data processing operation.

17. The method of claim 1, wherein the one or more data objects comprises one or more columns of data, and
   wherein the interactive element is selectable to perform the data processing operation on current values in the columns of data at a time of selection of the interactive element.

18. The method of claim 1, the method comprising generating the response to the query by performing the data processing operation a first time in response to receiving the query,
   wherein the interactive element is selectable to perform the data processing operation an additional time.

19. A system comprising:
one or more computers; and
one or more computer-readable media storing instructions that, when executed by the one or more computers, cause the one or more computers to perform operations comprising:
   storing, by the one or more computers, data indicating a predetermined set of data processing operations for evaluating queries;
   receiving, by the one or more computers, a query;
   identifying, by the one or more computers, a data processing operation used to generate a response to the query and one or more data objects on which the identified data processing operation is applied to generate the response to the query;
   determining, by the one or more computers, that the data processing operation is included in the predetermined set of data processing operations; and
   in response to determining that the identified data processing operation is included in the predetermined set of data processing operations:
      generating, by the one or more computers, a data element definition for a derived data element based on the identified data processing operation and the identified one or more data objects, wherein the derived data element represents a type of data that results from performing the identified data processing operation on the identified one or more data objects; and
      updating, by the one or more computers, an interface area on a user interface to display an interactive element that represents the derived data element.

20. One or more non-transitory computer-readable media storing instructions that, when executed by one or more computers, cause the one or more computers to perform operations comprising:
   storing, by the one or more computers, data indicating a predetermined set of data processing operations for evaluating queries;
   receiving, by the one or more computers, a query;
   identifying, by the one or more computers, a data processing operation used to generate a response to the query and one or more data objects on which the identified data processing operation is applied to generate the response to the query;
   determining, by the one or more computers, that the data processing operation is included in the predetermined set of data processing operations; and
   in response to determining that the identified data processing operation is included in the predetermined set of data processing operations:
      generating, by the one or more computers, a data element definition for a derived data element based on the identified data processing operation and the identified one or more data objects, wherein the derived data element represents a type of data that results from performing the identified data processing operation on the identified one or more data objects; and updating, by the one or more computers, an interface area on a user interface to display an interactive element that represents the derived data element.

\* \* \* \* \*